US012559098B2

(12) United States Patent
Nishiura et al.

(10) Patent No.: US 12,559,098 B2
(45) Date of Patent: Feb. 24, 2026

(54) VEHICLE CONTROL DEVICE AND OBSTACLE AVOIDANCE CONTROL METHOD

(71) Applicant: Hitachi Astemo, Ltd., Hitachinaka (JP)

(72) Inventors: Chikara Nishiura, Tokyo (JP); Satoshi Kashiwamura, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 580 days.

(21) Appl. No.: 17/924,624

(22) PCT Filed: Feb. 26, 2021

(86) PCT No.: PCT/JP2021/007426
§ 371 (c)(1),
(2) Date: Nov. 10, 2022

(87) PCT Pub. No.: WO2022/049802
PCT Pub. Date: Mar. 10, 2022

(65) Prior Publication Data
US 2023/0182726 A1 Jun. 15, 2023

(30) Foreign Application Priority Data

Sep. 4, 2020 (JP) ................................. 2020-148743

(51) Int. Cl.
B60W 30/095 (2012.01)
B60T 7/22 (2006.01)
(Continued)

(52) U.S. Cl.
CPC ........... B60W 30/0956 (2013.01); B60T 7/22 (2013.01); B60W 10/18 (2013.01); B60W 10/20 (2013.01);
(Continued)

(58) Field of Classification Search
CPC .. B60W 30/0956; B60W 10/18; B60W 10/20; B60W 50/029; B60W 2552/53;
(Continued)

(56) References Cited

U.S. PATENT DOCUMENTS 10,906,559 B1 * 2/2021 Cheon ................... G01S 13/931
2014/0207364 A1 7/2014 Eidehall et al.
(Continued)

FOREIGN PATENT DOCUMENTS

JP 2010-155545 A 7/2010
JP 2017-013749 A 1/2017
(Continued)

OTHER PUBLICATIONS

English Translation of International Search Report issued in corresponding International Application No. PCT/JP2021/007426, dated May 18, 2021.
(Continued)

*Primary Examiner* — Peter D Nolan
*Assistant Examiner* — Demetra R Smith-Stewart
(74) *Attorney, Agent, or Firm* — Foley & Lardner LLP

(57) ABSTRACT

A vehicle control device includes a vehicle position calculating unit, an obstacle determining unit, a collision possibility determining unit, an avoidance means selecting unit, an avoidance route calculating unit, and a steering control value calculating unit that calculates a steering control value and that outputs the steering control value to a steering actuator control unit. The avoidance route calculating unit calculates a target point for avoiding the obstacle, divides an avoidance section connecting the position of the vehicle to the target point into a plurality of partial sections, calculates a partial avoidance route in each of the partial sections, and calculates the avoidance route made up of the plurality of partial avoidance routes.

11 Claims, 21 Drawing Sheets

(51) Int. Cl.

| | |
|---|---|
| *B60W 10/18* | (2012.01) |
| *B60W 10/20* | (2006.01) |
| *B62D 15/02* | (2006.01) |
| *B60W 50/029* | (2012.01) |

(52) U.S. Cl.
CPC ....... *B62D 15/0265* (2013.01); *B60W 50/029*
(2013.01)

(58) Field of Classification Search
CPC ... B60W 2710/207; B60W 30/09; B60T 7/22;
B60T 2201/022; B60T 2270/402; B60T
8/17558; B62D 15/0265; G08G 1/165;
G08G 1/166
See application file for complete search history.

(56) References Cited

U.S. PATENT DOCUMENTS

| | | | |
|---|---|---|---|
| 2017/0008522 | A1 | 1/2017 | Sato et al. |
| 2019/0329759 | A1 | 10/2019 | Takeya |
| 2019/0377352 | A1 | 12/2019 | Weibwange et al. |
| 2020/0201323 | A1 | 6/2020 | Park |
| 2020/0238980 | A1 | 7/2020 | Goto et al. |

FOREIGN PATENT DOCUMENTS

| | | | | |
|---|---|---|---|---|
| JP | 2017-182563 | A | | 10/2017 |
| JP | 2017-226344 | A | | 12/2017 |
| JP | 2018197048 | A | * | 12/2018 |
| JP | 2019-043194 | A | | 3/2019 |
| JP | 2019-199185 | A | | 11/2019 |
| JP | 2020-015489 | A | | 1/2020 |
| KR | 101519287 | B1 | * | 5/2015 |

OTHER PUBLICATIONS

Li, S. et al., "Dynamic trajectory planning and tracking for autonomous vehicle with obstacle avoidance based on model predictive control", IEEE Access, 2019, vol. 7, pp. 132074-132086.
Wang, Y. et al., "Trajectory planning and tracking control of vehicle obstacle avoidance based on optimization control", 2019 Chinese Control Conference, 2019, pp. 3157-3162.

* cited by examiner

FIG. 2B

START

ACQUIRE INFORMATION
ON HOST VEHICLE POSITION    ~S601

CALCULATE
TARGET STEERING ANGLE    ~S602

CALCULATE
TARGET STEERING TORQUE    ~S603

OUTPUT TARGET STEERING TORQUE
TO STEERING ACTUATOR CONTROL UNIT    ~S604

END

START

CALCULATE TARGET BRAKING FORCE    ~S611

OUTPUT TARGET BRAKING FORCE
TO BRAKING ACTUATOR CONTROL UNIT    ~S612

END

*FIG. 9*

START

EXECUTE PROCESS OF GRADUALLY
DECREASING TARGET STEERING TOQUE   ~S1301

END

VEHICLE CONTROL DEVICE AND OBSTACLE AVOIDANCE CONTROL METHOD

INCORPORATION BY REFERENCE

This application claims priority to Japanese Patent Application No. 2020-148743 filed on Sep. 4, 2020, the contents of which are incorporated herein by reference.

TECHNICAL FIELD

The present invention relates to a vehicle control technique for avoiding an obstacle.

BACKGROUND ART

A technique is proposed, according to which, in automatically executing emergent avoidance of an obstacle, either braking-based avoidance or steering-based avoidance is selected according to a vehicle speed and a target traveling route is calculated using optimization processing (see, for example, PTL 1).

Another technique is also proposed, according to which, to prevent a case where route correction cannot be completed within an updating time at the time of creating a target route and consequently an obstacle cannot be avoided properly, a part that calculates a single avoidance route is separately provided so that an avoidance route is outputted in priority when there is a risk of collision with an obstacle (see, for example, PTL 2).

CITATION LIST

Patent Literature

PTL 1: JP 2010-155545 A
PTL 2: JP 2019-43194 A

SUMMARY OF INVENTION

Technical Problem

When obstacle avoidance by autonomous steering is carried out in a system that does not include a rear camera, a rear radar, a side radar, and the like, that is, a system including a front camera and a front radar, the system cannot detect a vehicle approaching from behind and therefore needs to avoid an obstacle in a driving lane where the host vehicle carrying the system is running. In this case, the host vehicle has to stay in the driving lane while avoiding the obstacle and therefore a highly precise vehicle position is required.

However, conventional techniques place the focus on reliable calculation of an avoidance route (on a specific method of route calculation or separate calculation of a main target route and an avoidance route). This leads to a case where when the vehicle tries to avoid the obstacle, based on a calculated avoidance route, the vehicle is not able to correctly trace the avoidance route due to a dead time of an actuator, a delay in response of the vehicle's dynamic characteristics, and the like, in which case the vehicle may fail to avoid the obstacle. In addition, according to the conventional technique, a route for the vehicle to travel to pass the closet point to the obstacle is calculated at the time of obstacle avoidance. There is a possibility, therefore, that the vehicle remaining in an unstable state may pass near the obstacle, which gives the driver a sense of serious anxiety.

Solution to Problem

A typical example of the present invention disclosed herein is as follows. A vehicle control device that controls a vehicle includes: a vehicle position calculating unit that calculates a position of the vehicle; an obstacle determining unit that determines presence or absence of an obstacle on a traveling route of the vehicle; a collision possibility determining unit that determines whether the vehicle collides with the obstacle; an avoidance means selecting unit that selects either braking or steering as a means for avoiding the obstacle; a braking control value calculating unit that calculates a braking control value for achieving braking to avoid the obstacle, the braking control value calculating unit outputting the braking control value to a braking actuator control unit that controls braking of the vehicle; an avoidance route calculating unit that calculates an avoidance route for avoiding the obstacle; and a steering control value calculating unit that calculates a steering control value for achieving steering to avoid the obstacle, based on a position of the vehicle and on the avoidance route, the steering control value calculating unit outputting the steering control value to a steering actuator control unit that controls steering of the vehicle. The avoidance route calculating unit calculates a target point for avoiding the obstacle, divides an avoidance section connecting the position of the vehicle to the target point into a plurality of partial sections, calculates a partial avoidance route in each of the partial sections, and calculates the avoidance route made up of the plurality of partial avoidance routes.

Advantageous Effects of Invention

The present invention provides a vehicle control device that gives a driver a sense of security and that achieves highly precise obstacle avoidance. Problems, configurations, and effects that are not described above will be made clear by the following description of embodiments.

BRIEF DESCRIPTION OF DRAWINGS

FIG. 2B depicts an example of the functional configuration of the driving assistance system according to the first embodiment.

FIG. 9 is a flowchart for explaining an example of a control state confirmation process executed by a driving assistance system of a second embodiment.

DESCRIPTION OF EMBODIMENTS

Figure 1:
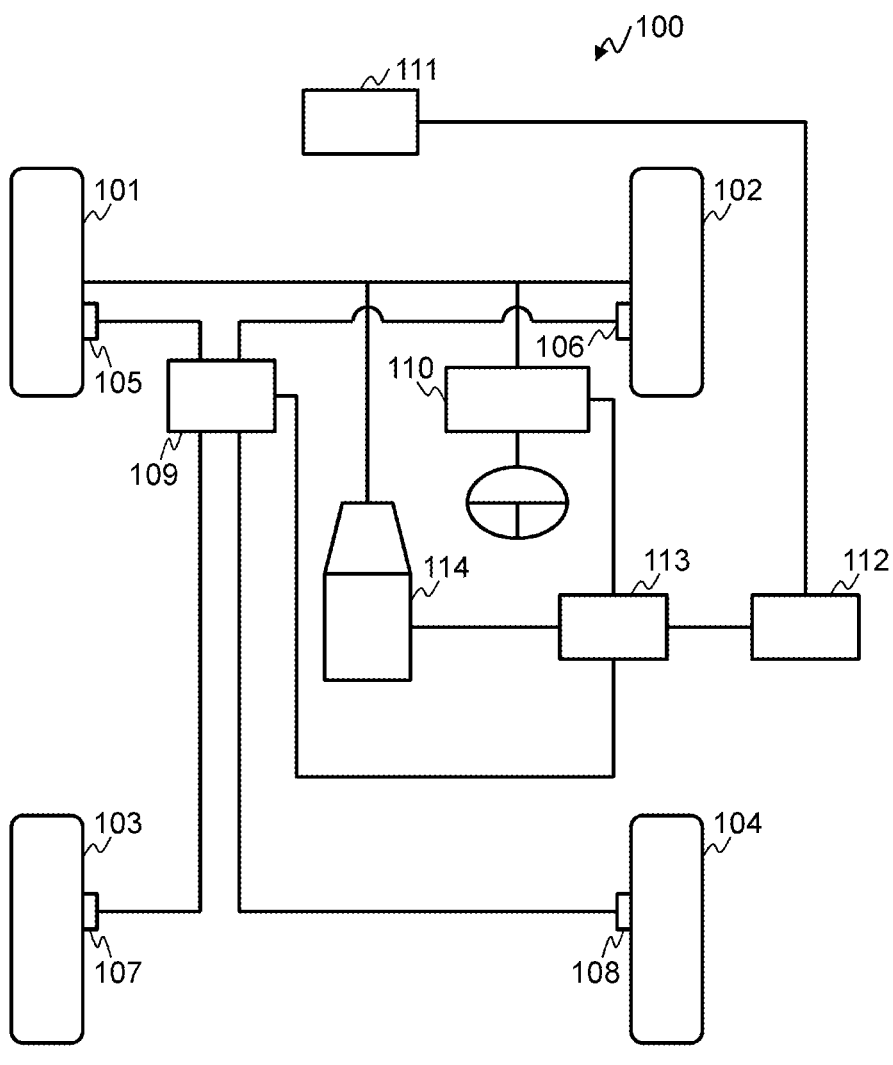
FIG. 1 depicts an example of a configuration of a vehicle equipped with a driving assistance system according to a first embodiment.

Embodiments of the present invention will hereinafter be described with reference to the drawings. It should be noted, however, that the present invention is not interpreted as the invention limited to the descriptive contents of embodiments described below. Those skilled in the art can easily understand that specific configurations of the invention may be changed or modified within a range in which changes/modification do not deviate from the concept and substance of the present invention. In the configurations of the invention described below, the same or similar constituent elements or functions are denoted by the same reference signs, and redundant description will be omitted. In this specification, such notations as "first", "second", and "third" are attached to constituent elements to identify them, and do not necessarily limit the number or order thereof. The positions, sizes, shapes, ranges, and the like of constituent elements shown in drawings, etc., may not represent the actual positions, sizes, shapes, ranges, and the like. This is to facilitate understanding of the invention. The constituent elements of the present invention, therefore, are not limited by the positions, sizes, shapes, ranges, and the like shown in the drawings, etc.

First Embodiment

FIG. 1 depicts an example of a configuration of a vehicle equipped with a driving assistance system according to a first embodiment.

A vehicle 100 is a four-wheel vehicle having a left front wheel 101, a right front wheel 102, a left rear wheel 103, and a right rear wheel 104. The wheel 101, 102, 103, and 104 are provided respectively with wheel cylinders 105, 106, 107, and 108 that make up a hydraulic brake system.

The vehicle 100 includes a wheel cylinder hydraulic control device (braking control device) 109, a steering device 110, an external environment recognition control unit 111, an action strategy controller 112, a movement strategy controller 113, and an engine 114.

The external environment recognition control unit 111, the action strategy controller 112, and the movement strategy controller 113 are each equipped with a microcomputer, and are connected to other devices via an in-vehicle network so as to be able to communicate the devices.

The wheel cylinder hydraulic control device 109 is a device that adjusts a hydraulic pressure of each of the wheel cylinders 105, 106, 107, and 108, such as, typically, an anti-skid brake system. It should be noted that the wheel cylinder hydraulic control device 109 is not limited to a hydraulic friction brake system but may be provided as an electronic friction brake system.

The engine 114 is an internal combustion engine whose output torque is electronically controlled.

The steering device 110 is a device that is equipped with a steering-assist actuator to allow autonomous steering, such as, typically, a motor-driven power steering device equipped with a motor that generates a steering assist force.

The external environment recognition control unit 111 is a device that processes map information and image information acquired by a camera to acquire information on an external environment in front of the vehicle 100.

The action strategy controller 112 determines whether a possibility of the vehicle 100 colliding with an obstacle exists, based on external environment information acquired by the external environment recognition control unit 111. When determining that the possibility of the vehicle 100 colliding with the obstacle exists, the action strategy controller 112 selects either steering-based avoidance or braking-based avoidance, as an avoidance means. In addition, when having selected steering-based avoidance, the action strategy controller 112 calculates an avoidance route.

The movement strategy controller 113 determines the content of control over the wheel cylinder hydraulic control device 109 and the steering device 110, based on movement information on the vehicle 100, on a host vehicle position obtained from external environment information, and on an avoidance route calculated by the action strategy controller 112.

Figure 2A:
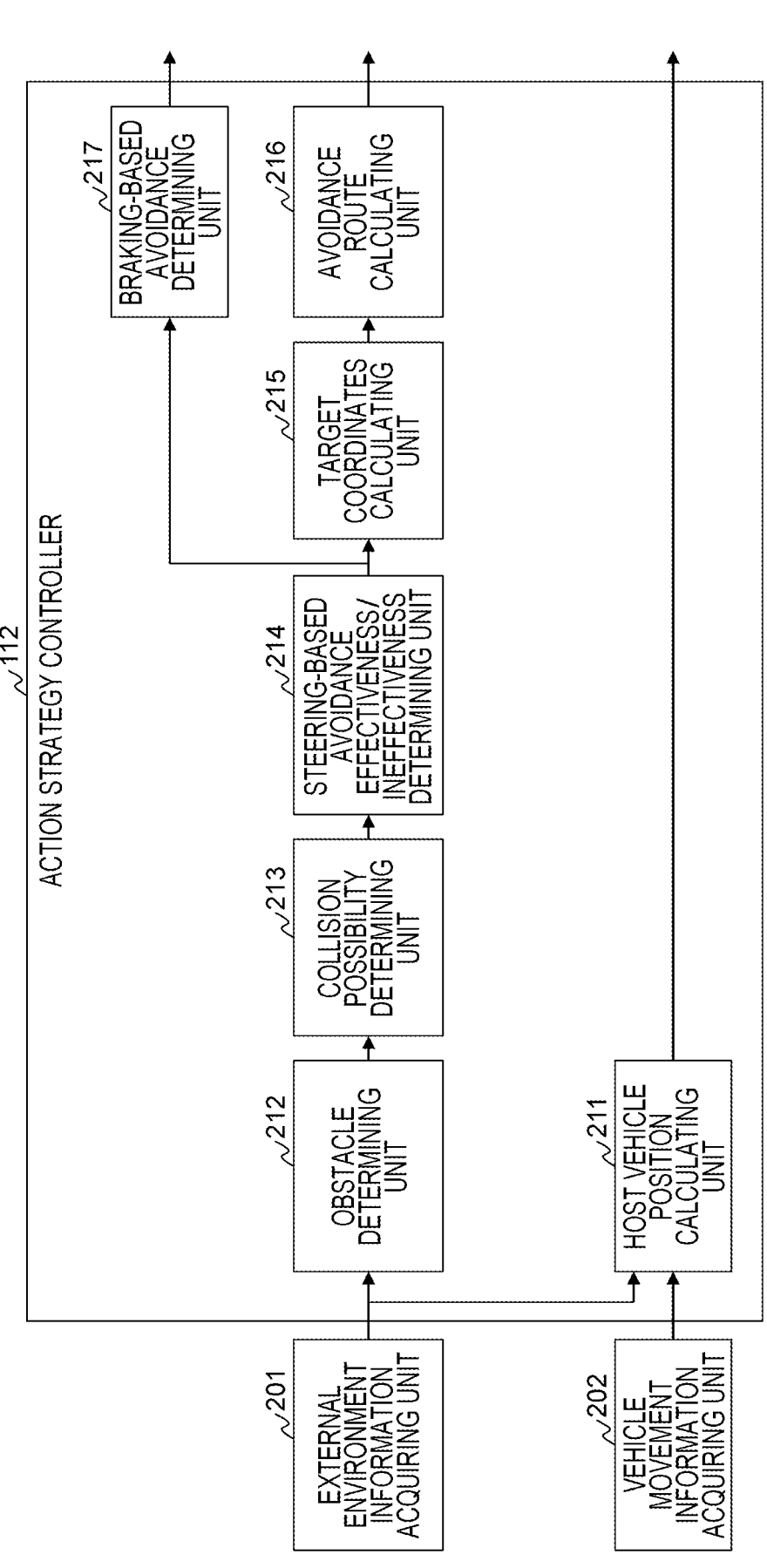
FIG. 2A depicts an example of a functional configuration of the driving assistance system according to the first embodiment.
Figure 2B:
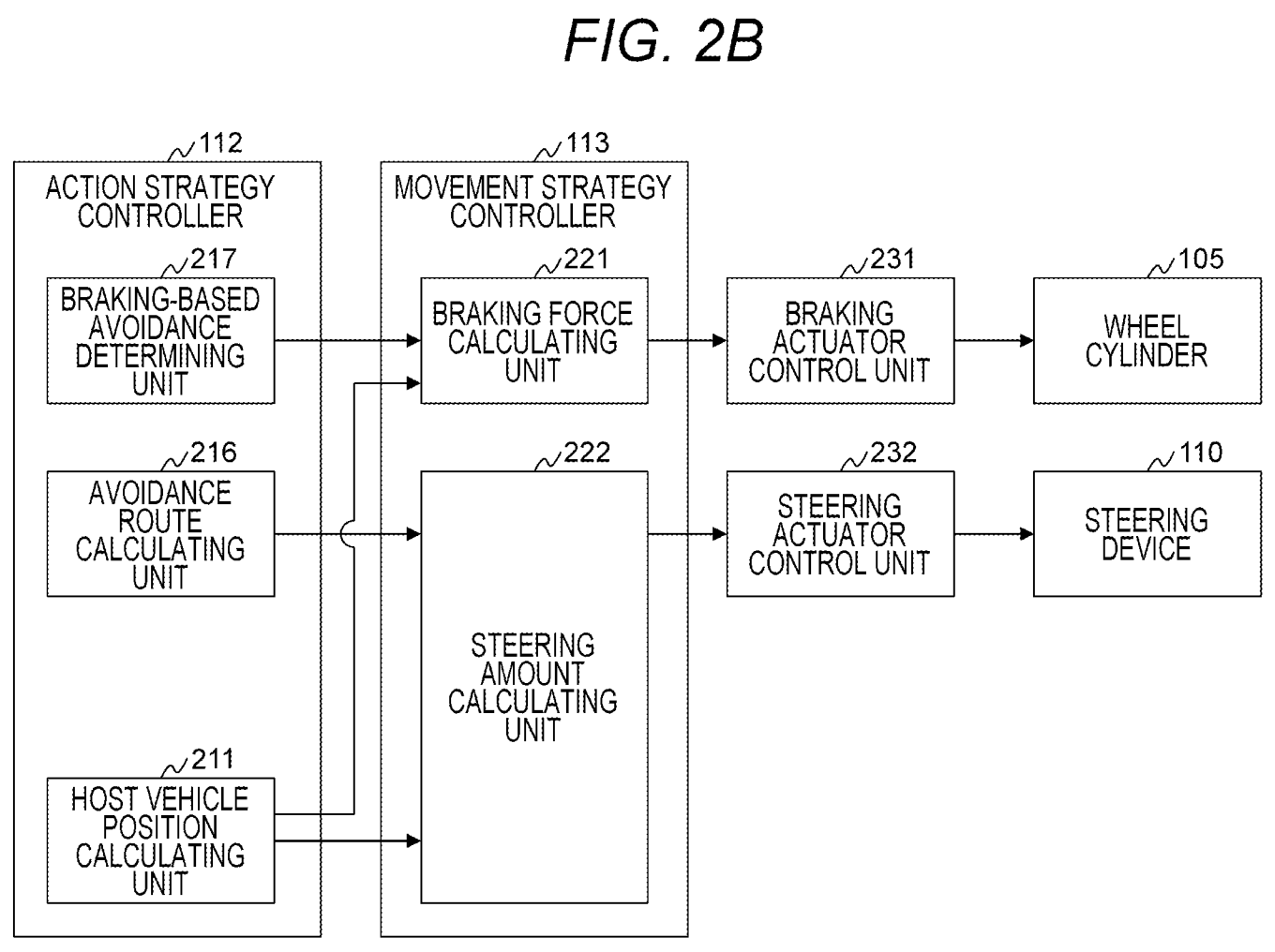

FIGS. 2A and 2B each depict examples of a functional configuration of the driving assistance system according to the first embodiment. These separate two figures are presented for convenience in description.

An external environment information acquiring unit 201 is a functional unit included in the external environment recognition control unit 111, and processes image information to acquire information on an external environment in front of the vehicle 100.

A vehicle movement information acquiring unit 202 acquires movement information about a state of movement of the vehicle 100. The movement information includes a yaw rate, a vehicle speed, a brake fluid pressure, and the like of the vehicle 100.

The action strategy controller 112 includes a host vehicle position calculating unit 211, an obstacle determining unit 212, a collision possibility determining unit 213, a steering-based avoidance effectiveness/ineffectiveness determining unit 214, a target coordinate calculating unit 215, an avoidance route calculating unit 216, and a braking-based avoidance determining unit 217. Although not illustrated, the action strategy controller 112 holds specification values of the vehicle 100. The specification values may be set in advance in the action strategy controller 112 or may be inputted from outside to the action strategy controller 112.

The host vehicle position calculating unit 211 calculates the current position of the vehicle 100, based on external environment information inputted from the external environment information acquiring unit 201 and on movement information inputted from the vehicle movement information acquiring unit 202. The host vehicle position calculating unit 211 outputs information (host vehicle position information) indicating the calculated current position of the vehicle 100, to the movement strategy controller 113.

The obstacle determining unit 212 determines whether an obstacle is present in front of the vehicle 100, based on external environment information inputted from the external environment information acquiring unit 201. When an obstacle is present in front of the vehicle 100, the obstacle determining unit 212 outputs an activation instruction to the collision possibility determining unit 213.

The collision possibility determining unit 213 calculates a probability value indicating a possibility of the vehicle 100 colliding with an obstacle present ahead. The collision possibility determining unit 213 determines whether the possibility of the vehicle 100 colliding with the obstacle present ahead exists, based on a result of comparison between the probability value and a threshold. When the possibility of the vehicle 100 colliding with the obstacle present ahead exists, the collision possibility determining unit 213 outputs an activation instruction to the steering-based avoidance effectiveness/ineffectiveness determining unit 214.

The steering-based avoidance effectiveness/ineffectiveness determining unit 214 determines whether an obstacle can be avoided by a steering operation. When an obstacle can be avoided by a steering operation, the steering-based avoidance effectiveness/ineffectiveness determining unit 214 outputs an activation instruction to the target coordinate calculating unit 215. When an obstacle cannot be avoided by a steering operation, the steering-based avoidance effectiveness/ineffectiveness determining unit 214 outputs an activation instruction to the braking-based avoidance determining unit 217. The steering-based avoidance effectiveness/ineffectiveness determining unit 214 functions as a functional unit that selects one of two avoidance means: steering-based avoidance and braking-based avoidance.

The target coordinate calculating unit 215 calculates coordinates (target coordinates) of a target point of the vehicle 100, the target point being a point for avoiding an obstacle.

The avoidance route calculating unit 216 calculates an avoidance route for avoiding a collision with an obstacle by a steering operation, based on target coordinates inputted from the target coordinate calculating unit 215. The avoidance route calculating unit 216 outputs a steering control instruction, together with information on the calculated avoidance route (avoidance route information), to the movement strategy controller 113.

The braking-based avoidance determining unit 217 determines whether or not to avoid an obstacle by a braking operation. When avoiding the obstacle by the braking operation, the braking-based avoidance determining unit 217 outputs an instruction on braking control for performing the avoidance, to the movement strategy controller 113.

The movement strategy controller 113 includes a braking force calculating unit 221 and a steering amount calculating unit 222.

The braking force calculating unit 221 calculates a braking force for carrying out a braking operation, and outputs the braking force to the braking actuator control unit 231. When receiving an avoidance instruction to avoid an obstacle by braking control, the braking force calculating unit 221 calculates a braking force for carrying out a braking operation for avoiding a collision with the obstacle, based on host vehicle position information inputted from the host vehicle position calculating unit 211 and on an activation instruction inputted from the braking-based avoidance determining unit 217.

The steering amount calculating unit 222 calculates a steering amount for carrying out a steering operation and outputs the calculated steering amount to the steering actuator control unit 232. When receiving an avoidance instruction to avoid an obstacle by steering control, the steering amount calculating unit 222 calculates a steering amount for carrying out a steering operation for avoiding a collision with the obstacle, based on host vehicle position information inputted from the host vehicle position calculating unit 211 and on avoidance route information inputted from the avoidance route calculating unit 216.

A braking actuator control unit 231 is a functional unit included in the wheel cylinder hydraulic control device 109, and outputs a control value to each of the wheel cylinders 105, 106, 107, and 108, based on information on a braking force, the information being inputted from the braking force calculating unit 221.

A steering actuator control unit 232 is a functional unit included in the steering device 110, and outputs a control value to the steering device 110, based on information on a steering amount, the information being inputted from the steering amount calculating unit 222.

It should be noted that functional units included in the action strategy controller 112 and the movement strategy controller 113 may be provided such that a plurality of functional units are integrated into one functional unit or one functional unit may be divided into a plurality of modules each exerting a specific function.

Obstacle avoidance control will then be described in detail. In the first embodiment, obstacle avoidance control that is carried out when the vehicle 100 is traveling in a straight lane will be described.

Figure 3:
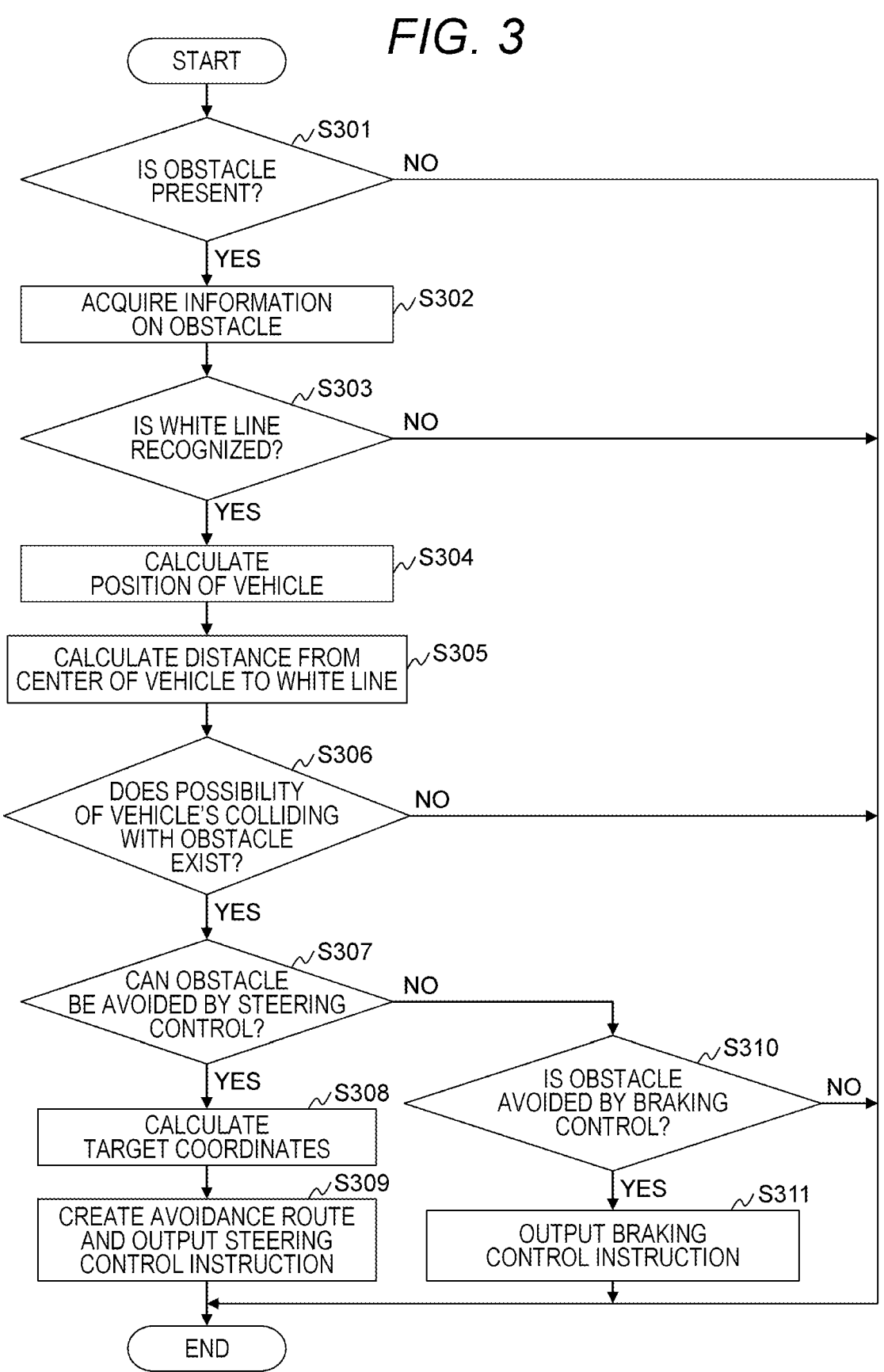
FIG. 3 is a flowchart for explaining an example of an obstacle avoidance determination process executed by the driving assistance system according to the first embodiment.
Figure 4:
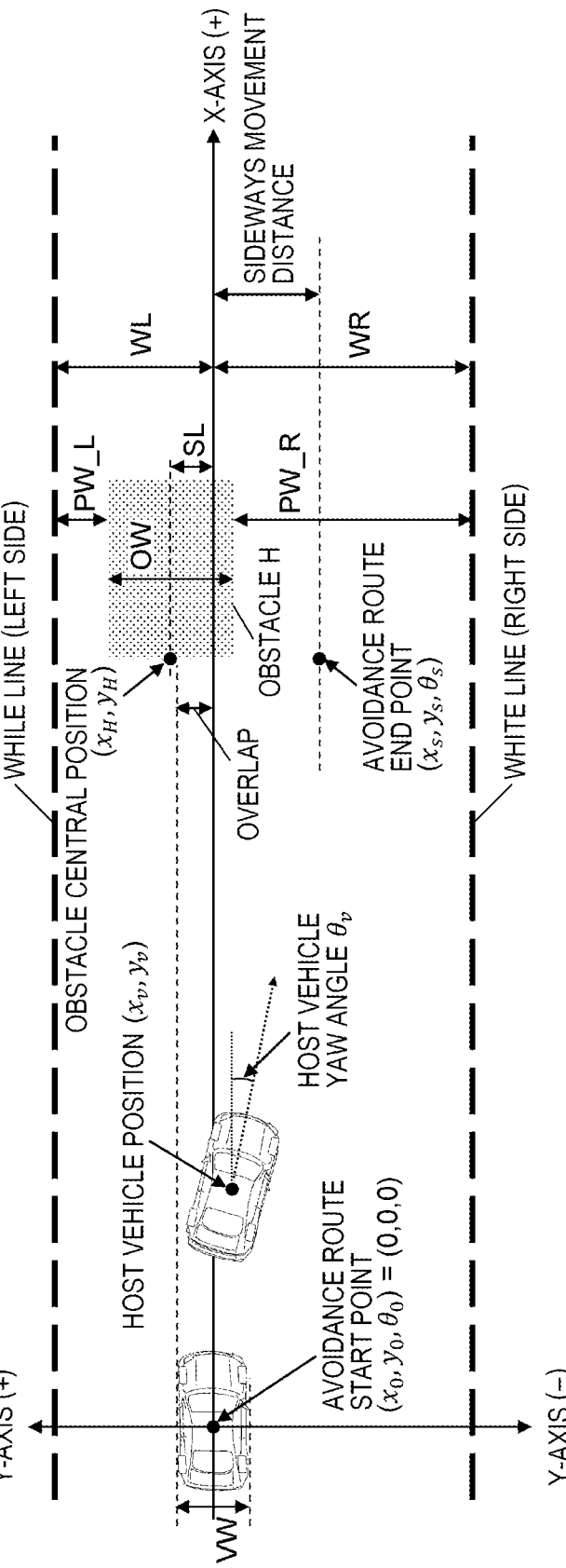
FIG. 4 is a diagram for explaining a coordinate system and physical quantities according to the first embodiment.

FIG. 3 is a flowchart for explaining an example of an obstacle avoidance determination process executed by the driving assistance system according to the first embodiment. FIG. 4 is a diagram for explaining a coordinate system and physical quantities according to the first embodiment. FIG.

7

8

5 is a diagram for explaining an example of an avoidance route created by the action strategy controller 112 of the first embodiment.

In the following description, [m], [rad], [%], and [Nm] represent units.

A coordinate system of the first embodiment will first be described with reference to FIG. 4. In the first embodiment, the position of the vehicle 100 at the start of an obstacle avoidance determination process is defined as an avoidance route start point (origin). The direction of a white line at the avoidance route start point is defined as an X-axis, and a yaw angle in the positive direction of the X-axis is defined as 0. In the first embodiment, the left side of the vehicle 100 with respect to its traveling direction is defined as the positive direction of a Y-axis while the right side of the vehicle 100 is defined as the negative direction of the Y-axis.

The action strategy controller 112 periodically executes the obstacle avoidance determination process described below.

The obstacle determining unit 212 of the action strategy controller 112 determines whether an obstacle H is present ahead of the vehicle 100 in its traveling path, based on external environment information acquired by the external environment information acquiring unit 201 (step S301).

When the obstacle H is not present ahead of the vehicle 100 in its traveling path, the action strategy controller 112 ends the obstacle avoidance determination process. When either a steering control intervention flag or a braking control intervention flag is set, the action strategy controller 112 cancels the flag.

When the obstacle H is present ahead of the vehicle 100 in its traveling path, the collision possibility determining unit 213 of the action strategy controller 112 acquires information on the obstacle H from the external environment information (step S302).

The information on the obstacle H includes the position and size of the obstacle H and the distance $L_{yh}$ [m] between the obstacle H and the vehicle 100. The position of the obstacle H is, for example, the central coordinates $(x_H, y_H)$ of the obstacle H, and the size of the obstacle H is, for example, the width OW [m] of the obstacle H.

Based on the external environment information, the collision possibility determining unit 213 of the action strategy controller 112 determines whether the driving assistance system is successfully recognizing white lines (step S303). In other words, whether the driving assistance system is able to recognize a driving lane where the vehicle 100 is running is determined.

When the driving assistance system fails to recognize white lines, the action strategy controller 112 ends the obstacle avoidance determination process. In this case, the driver makes an avoidance action by himself or herself.

When the driving assistance system is successfully recognizing the white lines, the host vehicle position calculating unit 211 of the action strategy controller 112 calculates the current position and direction of the vehicle 100 (step S304). Specifically, the host vehicle position calculating unit 211 calculates the current central coordinates $(x_v, y_v)$ and the direction $\theta_v$ of the vehicle 100. The central coordinates $(x_v, y_v)$ and the direction $\theta_v$ are put together to give host vehicle coordinates $(x_v, y_v, \theta_v)$.

The host vehicle position calculating unit 211 of the action strategy controller 112 calculates the distance WR [m] from the central coordinates of the vehicle 100 to a right white line and the distance WL [m] from the central coordinates to a left white line (step S305).

The collision possibility determining unit 213 of the action strategy controller 112 calculates a probability value indicating a possibility of the vehicle 100 colliding with the obstacle H, and determines whether the possibility of the vehicle 100 colliding with the obstacle H exists, based on the probability value (step S306). Specifically, the following process is executed.

The collision possibility determining unit 213 acquires a vehicle width VW [m] from the specification values of the vehicle 100. The collision possibility determining unit 213 calculates the distance SL [m] in the y direction between the central position of the vehicle 100 and the central position of the obstacle H, based on a y component $y_v$ of the host vehicle position coordinates and a y component $y_H$ of the central coordinates of the obstacle H.

Based on WR [m], WL [m], SL [m], and OW [m], the collision possibility determining unit 213 calculates the distance PW_R [m] between a right end of the obstacle H and the right white line and the distance PW_L [m] between a left end of the obstacle H and the left white line. Specifically, PW_R [m] is given by equation (1), and PW_L [m] is given by equation (2).

[Equation 1]

$$PW\_R = WR - \left(SL - \frac{OW}{2}\right) \tag{1}$$

[Equation 2]

$$PW\_L = WL - \left(SL + \frac{OW}{2}\right) \tag{2}$$

Based on PW_R [m], PW_L [m], WR [m], WL [m], and VW [m], the collision possibility determining unit 213 calculates a distance (overlap) in which the vehicle 100 and the obstacle H overlap each other.

The collision possibility determining unit 213 then divides the overlap by the width VW [m] of the vehicle 100, thereby calculating a left overlap rate (overlap rate) $LAP_{rate\_L}$ [%] and a right overlap rate $LAP_{rate\_R}$ [%]. Specifically, the right overlap rate $LAP_{rate\_R}$ [%] is given by equation (3), and the left overlap rate $LAP_{rate\_L}$ [%] is given by equation (4).

[Equation 3]

$$LAP_{rate\_R} = \frac{\left\{WR - \left(\frac{VW}{2}\right)\right\} - PW\_R}{VW} \times 100 \tag{3}$$

[Equation 4]

$$LAP_{rate\_L} = \frac{\left\{WL + \left(\frac{VW}{2}\right)\right\} - PW\_L}{VW} \times 100 \tag{4}$$

The collision possibility determining unit 213 defines the magnitude of the overlap rate as the probability value indicating the possibility of the vehicle 100 colliding with the obstacle H.

The collision possibility determining unit 213 determines that the possibility of the vehicle 100 colliding with the obstacle H exists when one of equations (5) and (6) holds.

[Equation 5]

$$-50\% \le LAP_{rate\_R} < 0\% \tag{5}$$

9

10

[Equation 6]

$$0\% < LAP_{rate\_L} \leq 50\% \tag{6}$$

When the possibility of the vehicle 100 colliding with the obstacle H does not exists, the action strategy controller 112 ends the obstacle avoidance determination process.

When the possibility of the vehicle 100 colliding with the obstacle H exists, the steering-based avoidance effectiveness/ineffectiveness determining unit 214 of the action strategy controller 112 determines whether obstacle avoidance by steering control is possible (step S307).

For example, the steering-based avoidance effectiveness/ineffectiveness determining unit 214 determines whether one of the distance PW_L [m] and distance PW_R [m] (left and right passage spaces), the distance PW_L [m] being the distance between the obstacle H and the left white line and the distance PW_R [m] being the distance between the obstacle H and the right white line, is equal to or larger than the vehicle width VW [m]. When one of PW_R [m] and PW_L [m] is equal to or larger than VW [m], the steering-based avoidance effectiveness/ineffectiveness determining unit 214 determines that obstacle avoidance by operation control is possible. When both PW_R [m] and PW_L [m] are smaller than VW [m], the steering-based avoidance effectiveness/ineffectiveness determining unit 214 determines that obstacle avoidance by operation control is impossible.

When obstacle avoidance by steering (operation) control is possible, the target coordinate calculating unit 215 of the action strategy controller 112 calculates target coordinates $(x_s, y_s)$ of an avoidance route and a target yaw angle $\theta_s$ (step S308). In this case, coordinates $(x_0, y_0)$ and a yaw angle $\theta_0$ of the start point of the avoidance route and the coordinates $(x_s, y_s)$ and the target yaw angle $\theta_s$ of the end point (target point) of the avoidance route are calculated. Specifically, the following process is executed.

The target coordinate calculating unit 215 sets the start point coordinates $(x_0, y_0)$ of the avoidance route, as the origin. In other words, the target coordinate calculating unit 215 sets the start point coordinates $(x_0, y_0)$ to (0, 0). The target coordinate calculating unit 215 sets the yaw angle $\theta_0$ at the start point of the avoidance route, to 0. In other words, the direction parallel to the white line is defined as a target direction. The start point coordinates $(x_0, y_0)$ of the avoidance route are the coordinates of the position of the vehicle 100 at the start of the obstacle avoidance determination process.

The target coordinate calculating unit 215 sets the distance in the X-axis direction between the vehicle 100 and the obstacle H, to $x_s$ of the target coordinates of the avoidance route.

$y_s$ of the target coordinates of the avoidance route represents an amount of sideways movement required for avoiding the obstacle H. Now, the avoidance route must be within the driving lane. A point reached by moving from $y_0$ of the start point coordinates of the avoidance route to the center of the passage space, therefore, is set to $y_s$ of the target coordinates. The target coordinate calculating unit 215 thus determines $y_s$ of the target coordinates by one of equation (7) and equation (8).

[Equation 7]

$$y_s = y_0 + \frac{PW\_R}{2} \tag{7}$$

-continued

[Equation 8]

$$y_s = y_0 + \frac{PW\_L}{2} \tag{8}$$

Finally, the target coordinate calculating unit 215 calculates the target yaw angle $\theta_s$ at the end point of the avoidance route. The process described above is the process executed at step S308.

The avoidance route calculating unit 216 of the action strategy controller 112 calculates the avoidance route, and, together with information on the avoidance route, outputs a steering control instruction to the movement strategy controller 113 (step S309). At this time, the avoidance route calculating unit 216 sets a steering control intervention flag. Thereafter, the action strategy controller 112 ends the obstacle avoidance determination process. Specifically, the following process is executed.

Figure 5:
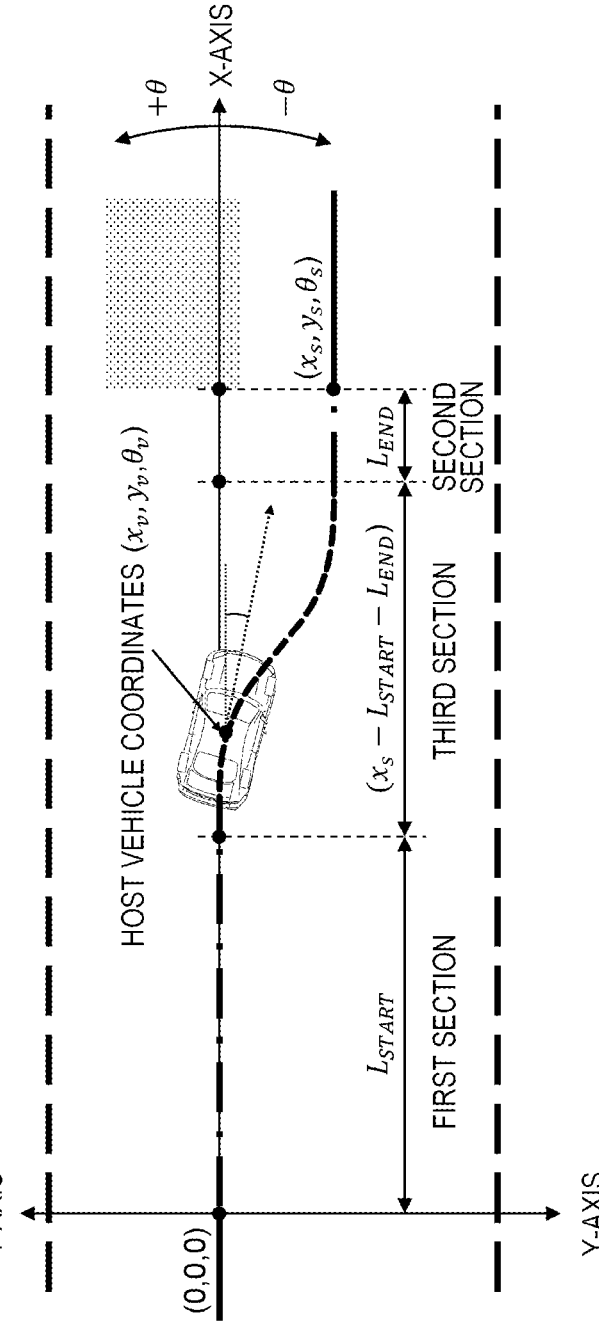
FIG. 5 is a diagram for explaining an example of an avoidance route created by an action strategy controller of the first embodiment.

As shown in FIG. 5, the avoidance route calculating unit 216 divides an avoidance section $[x_0, x_s]$ connecting the start point to the end point in the X-axis direction, into three sections: a first section, a second section, and a third section.

For the first section, the avoidance route calculating unit 216 calculates a first partial avoidance route of $L_{START}$ [m] in length that extends parallel to the X-axis in its positive direction, from the start point coordinates $(x_0, y_0)$.

The first section is set for the following reasons. The actuator delays in responding to an incoming steering instruction, thus causing a delay in an actual steering operation, which creates a dead time. In addition, the vehicle has dynamic characteristics that affect its sideways movement after steering (in general, the dynamic characteristics involve a second-order lag). Because of these facts, even if a target route (avoidance route) for making sideways movement from a point of start of steering-based avoidance intervention is given to the vehicle 100, the vehicle 100 cannot trace the target route. Because such a function of executing autonomous steering in the driving lane requires very delicate vehicle position precision, when a target route that is physically difficult to achieve is given, it is difficult to ensure sufficiently high vehicle position precision. In order to allow the vehicle to trace the target route without difficulty, a point of start of sideways movement needs to be shifted forward (traveling direction) from a point of start of the intervention. For these reasons, the driving assistance system of the first embodiment sets the first section and calculates the above-described first partial avoidance route for the first section. In other words, the first partial avoidance route serves as a route in which steering for avoiding the obstacle is not performed so that at least a delay in response by the actuator or a delay caused by the dynamic characteristics of the vehicle 100 is compensated.

It should be noted that $L_{START}$ [m] can be set freely, according to parameters related to the actuator and dynamic characteristics, the parameters varying depending on types of the vehicle 100. For example, $L_{START}$ [m] is set based on the worst parameter value among actuator parameter values.

For the second section, the avoidance route calculating unit 216 calculates a second partial avoidance route of $L_{END}$ [m] in length that extends parallel to the X-axis in its negative direction, from the end point coordinates $(x_s, y_s)$.

The vehicle makes an avoidance action of passing near the obstacle while making a turning movement or an avoidance action of completing a turning movement before reaching the obstacle and then running straight through near the obstacle. The latter avoidance action gives the driver a greater sense of security. The driving assistance system of the first embodiment sets the second section in order to ensure the driver's sense of security, and calculates the above second partial avoidance route for the second section. In other words, the second partial avoidance route serves as a route in which steering for avoiding the obstacle is not performed so that the stability of the vehicle's behavior in avoiding the obstacle is ensured.

From the viewpoint of ensuring the driver's sense of security, $L_{END}$ [m] is set as an arbitrarily selected value. It should be noted, however, that $L_{END}$ [m] can be set freely, based on a parameter related to a degree of the sense of security given to the driver.

For the third section, the avoidance route calculating unit 216 calculates a third partial avoidance route that is a curved route given by a cubic function expressed by equation (9). In other words, the third partial avoidance route serves as a route in which steering for avoiding the obstacle is started from the end point of the first section and is ended before the start of the second section.

[Equation 9]

$$f(x)=ax^3+bx^2+cx+d \qquad (9)$$

The third partial avoidance route may be any type of route as long as it connects the end point of the first partial avoidance route to the start point of the second avoidance route.

The avoidance route calculating unit 216 outputs information on the avoidance route made up of the first partial avoidance route, the second partial avoidance route, and the third partial avoidance route, to the movement strategy controller 113. The process described above is the process executed at step S309.

At step S307, when obstacle avoidance by steering control is impossible, the braking-based avoidance determining unit 217 of the action strategy controller 112 determines whether or not to avoid the obstacle H by the braking-based control (step S310).

Specifically, the braking-based avoidance determining unit 217 determines whether the distance $L_{vh}$ [m] between the vehicle 100 and the obstacle H is smaller than an intervention threshold Thresh_Brake. When $L_{vh}$ [m] is smaller than the intervention threshold Thresh_Brake, the braking-based avoidance determining unit 217 determines avoiding the obstacle H by braking-based control. The intervention threshold Thresh_Brake is given by equation (10).

[Equation 10]

$$\text{Thresh\_Brake} = \left( \frac{V_{brake}^2}{2S_{brake}} + Dist\_\text{Offset} \right) \qquad (10)$$

In equation 10, $V_{brake}$ denotes a braking start determination vehicle speed, $S_{brake}$ denotes a set deceleration rate, and Dist_Offset denotes a distance for which a delay in response by the actuator and a free running distance are taken into consideration.

When the obstacle H is not avoided by braking-based control, the action strategy controller 112 ends the obstacle avoidance determination process.

When the obstacle H is avoided by braking-based control, the braking-based avoidance determining unit 217 of the action strategy controller 112 outputs a braking control instruction to the movement strategy controller 113 (step S311). At this time, the braking-based avoidance determining unit 217 sets a braking control intervention flag. Thereafter, the action strategy controller 112 ends the obstacle avoidance determination process.

Figure 6A:
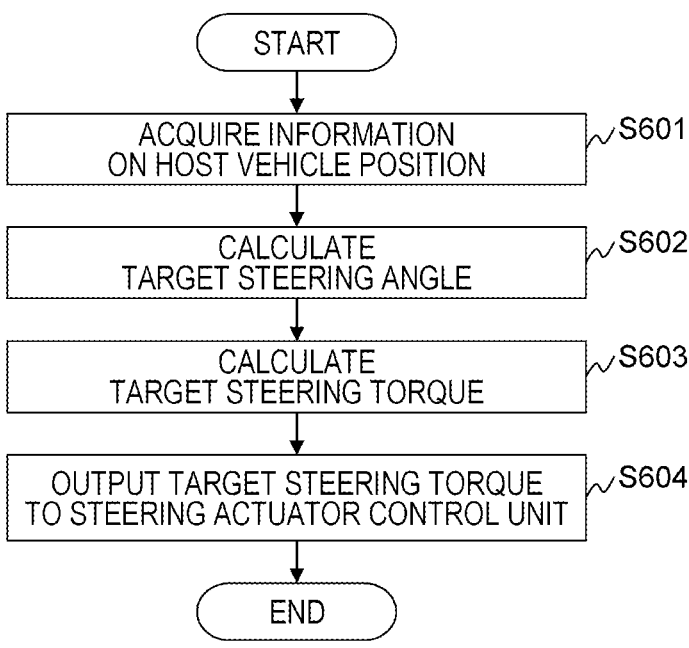
FIG. 6A is a flowchart for explaining an example of a control process executed by the driving assistance system of the first embodiment.
Figure 6B:
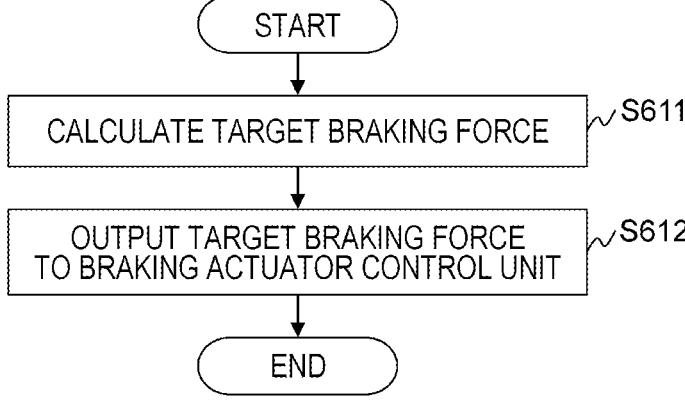
FIG. 6B is a flowchart for explaining an example of the control process executed by the driving assistance system of the first embodiment.

FIGS. 6A and 6B are flowcharts for explaining examples of a control process executed by the driving assistance system of the first embodiment.

FIG. 6A depicts a control process that is executed when the action strategy controller 112 outputs a steering control instruction together with information on an avoidance route. The control process of FIG. 6A is periodically executed until the obstacle is avoided.

The steering amount calculating unit 222 of the movement strategy controller 113 acquires information on the host vehicle position ($x_v$, $y_v$, $\theta_v$) from the action strategy controller 112 (step S601), and calculates a target steering angle needed for following the avoidance route (step S602).

For example, the steering amount calculating unit 222 calculates a target steering angle target_$\delta_{steer}$ [deg] from the host vehicle position ($x_v$, $y_v$, $\theta_v$), using, for example, a forward watching model. It is preferable that $L_{START}$ [m] be set equal to or longer than a forward watching distance.

The steering amount calculating unit 222 of the movement strategy controller 113 calculates a target steering torque Trq$_{steer}$ from feedback on a difference between the target steering angle target_$\delta$steer [deg] and a current steering angle real_$\delta_{steer}$ [deg] acquired from the steering device 110 (step S603).

The steering amount calculating unit 222 of the movement strategy controller 113 outputs the target steering torque Trq$_{steer}$ to the steering actuator control unit 232 (step S604).

The steering actuator control unit 232 controls the steering device 110, based on the target steering torque Trq$_{steer}$, thereby causing the vehicle to avoid the obstacle.

FIG. 6B depicts a control process that is executed when the action strategy controller 112 outputs a braking control instruction.

The braking force calculating unit 221 of the movement strategy controller 113 calculates a target braking force (step S611). For example, the braking force calculating unit 221 calculates a set deceleration rate as the target braking force.

The braking force calculating unit 221 of the movement strategy controller 113 outputs the target braking force to the braking actuator control unit 231 (step S612).

The braking actuator control unit 231 controls the wheel cylinders 105, 106, 107, and 108, based on the target braking force, thereby causing the vehicle to avoid the obstacle.

Figure 7:
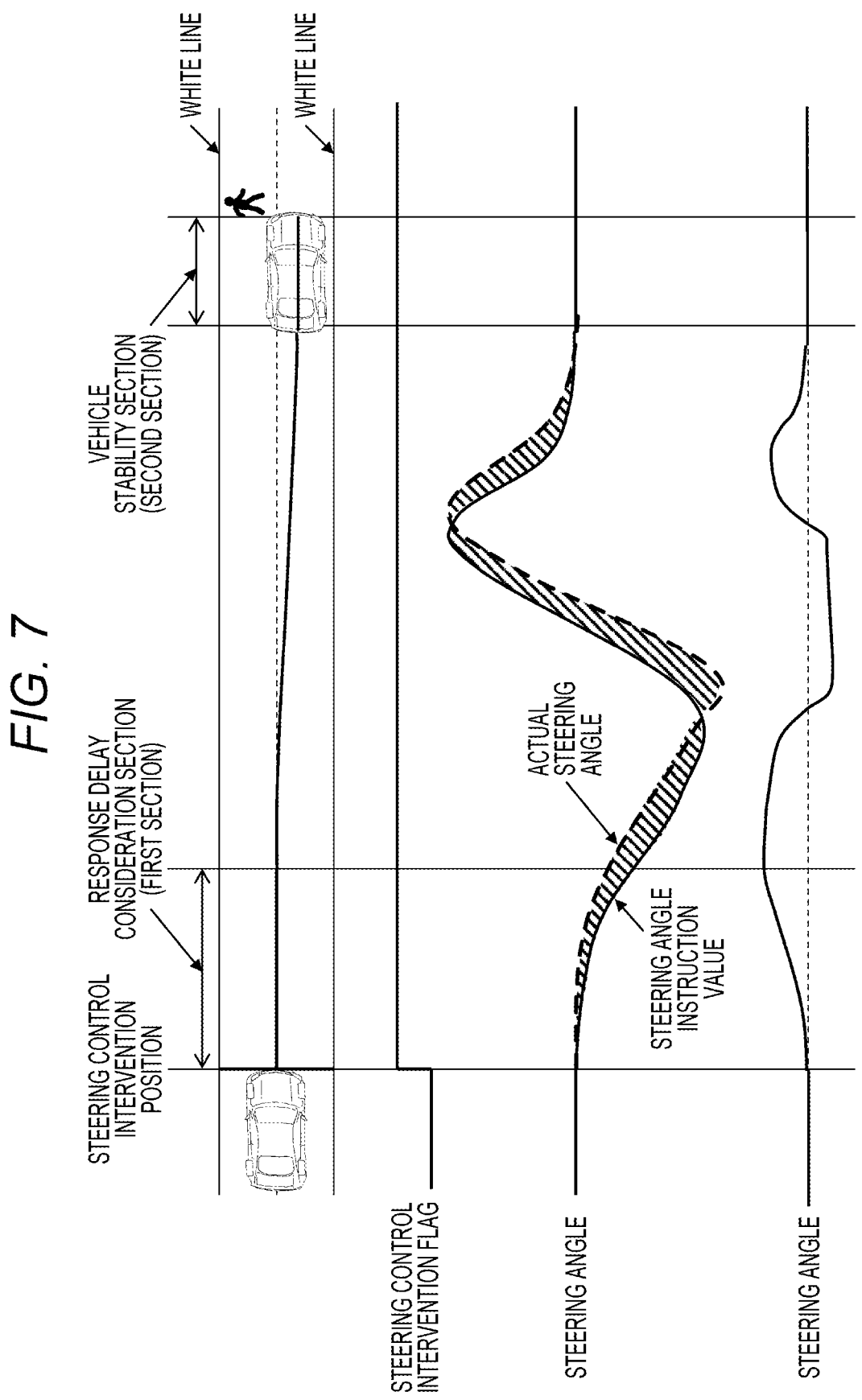
FIG. 7 depicts an example of a steering-based avoidance action made by the driving assistance system of the first embodiment.

FIG. 7 depicts an example of a steering-based avoidance action made by the driving assistance system of the first embodiment.

When determining that obstacle avoidance by steering control is possible (YES in step S307), the action strategy controller 112 sets a steering control intervention flag and outputs a steering control instruction together with an avoidance route (step S309).

When starting steering, the movement strategy controller 113 calculates a target steering angle with respect to a point $L_{START}$ [m] distant ahead of the host vehicle (step S602), and calculates a steering torque instruction value such that an actual steering angle matches the target steering angle (step S603). Specifically, a steering torque instruction value corresponding to a difference (hatched portion) between the target steering angle and the actual steering angle is calculated. Through this process, the vehicle, whose steering angle is controlled, makes a sideways movement.

Figure 8:
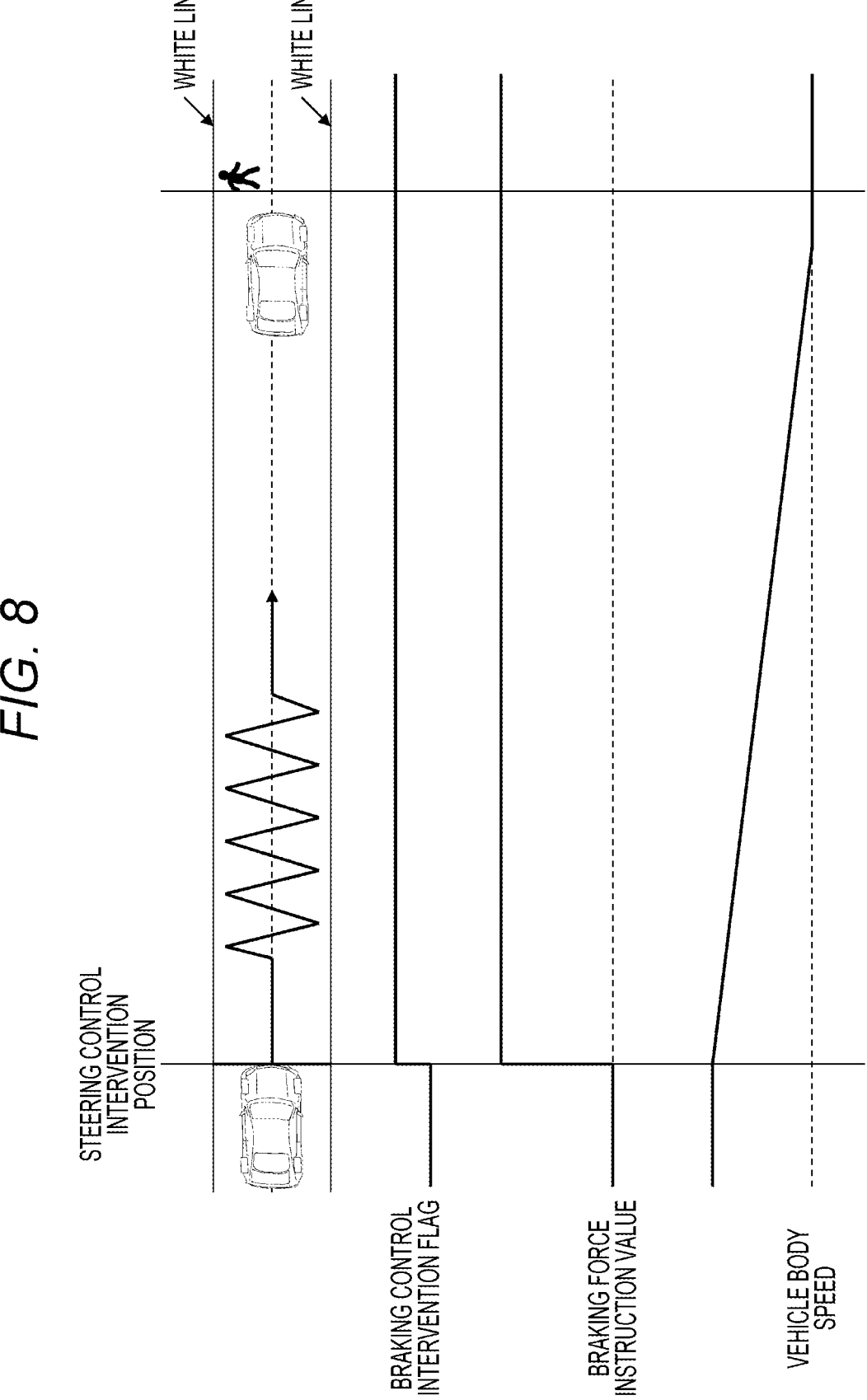
FIG. 8 depicts an example of a braking-based avoidance action made by the driving assistance system of the first embodiment.

FIG. 8 depicts an example of a braking-based avoidance action made by the driving assistance system of the first embodiment.

When determining that obstacle avoidance by steering control is impossible (NO at step S307) and determining avoiding the obstacle H by braking control, the action strategy controller 112 sets a braking control intervention flag and outputs a braking control instruction (step S311).

The movement strategy controller 113 outputs a given target braking force at a step (step S612). Based on a braking force instruction value, the braking actuator control unit 231 controls the wheel cylinders 105, 106, 107, and 108, thereby reducing a vehicle speed.

According to the first embodiment, when creating an avoidance route for steering-based avoidance, the driving assistance system creates the avoidance route that includes a route for which a dead time of the actuator, a delay in the vehicle's response, and the like are taken into consideration and a route for which the stability of the vehicle 100 that gives the driver a sense of security is taken into consideration. Carrying out steering control of the vehicle 100 based on the avoidance route gives the driver a sense of security and allows the vehicle 100 to avoid the obstacle with high precision.

Second Embodiment

A second embodiment is different from a first embodiment in that control that takes a failure of vehicle 100 into consideration is carried out in the second embodiment. The second embodiment will hereinafter be described, with focus placed on a difference with the first embodiment.

The vehicle 100 of the second embodiment is the same as the vehicle 100 of the first embodiment in device configuration and functional configuration. In the second embodiment, the driving assistance system executes a process different from the process executed in the first embodiment.

Figure 9:
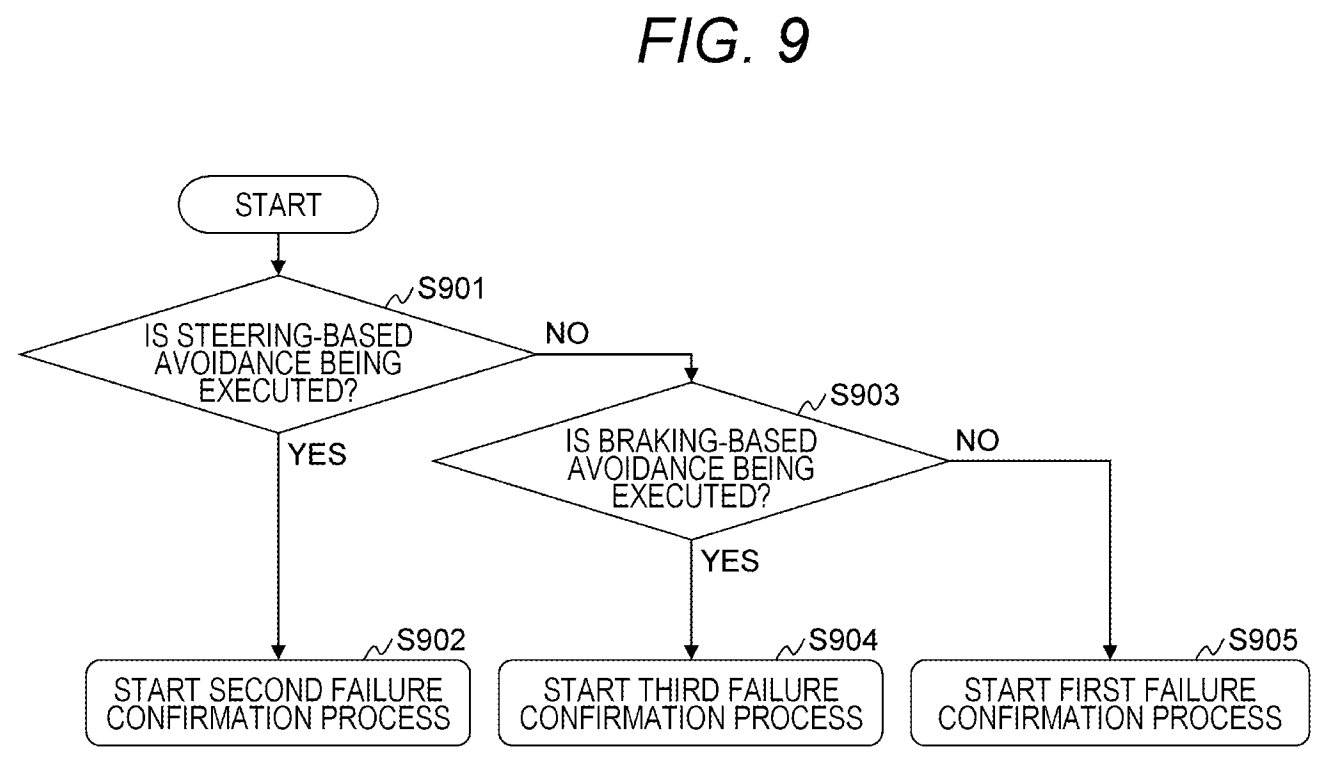

FIG. 9 is a flowchart for explaining an example of a control state confirmation process executed by a driving assistance system of the second embodiment. The control state confirmation process is periodically executed.

The action strategy controller 112 determines whether steering-based avoidance is being executed (step S901). For example, when a steering control intervention flag is set, the action strategy controller 112 determines that steering-based avoidance is being executed.

When steering-based avoidance is being executed, the action strategy controller 112 starts a second failure confirmation process (step S902). The second failure confirmation process will be described in detail with reference to FIG. 12.

When steering-based avoidance is not being executed, the action strategy controller 112 determines whether braking-based avoidance is being executed (step S903). For example, when a braking control intervention flag is set, the action strategy controller 112 determines that braking-based avoidance is being executed.

When the braking-based avoidance is being executed, the action strategy controller 112 starts a third failure confirmation process (step S904). The third failure confirmation process will be described in detail with reference to FIG. 16.

When braking-based avoidance is not being executed, the action strategy controller 112 starts a first failure confirmation process (step S905). The first failure confirmation process will be described in detail with reference to FIG. 10.

Figure 10:
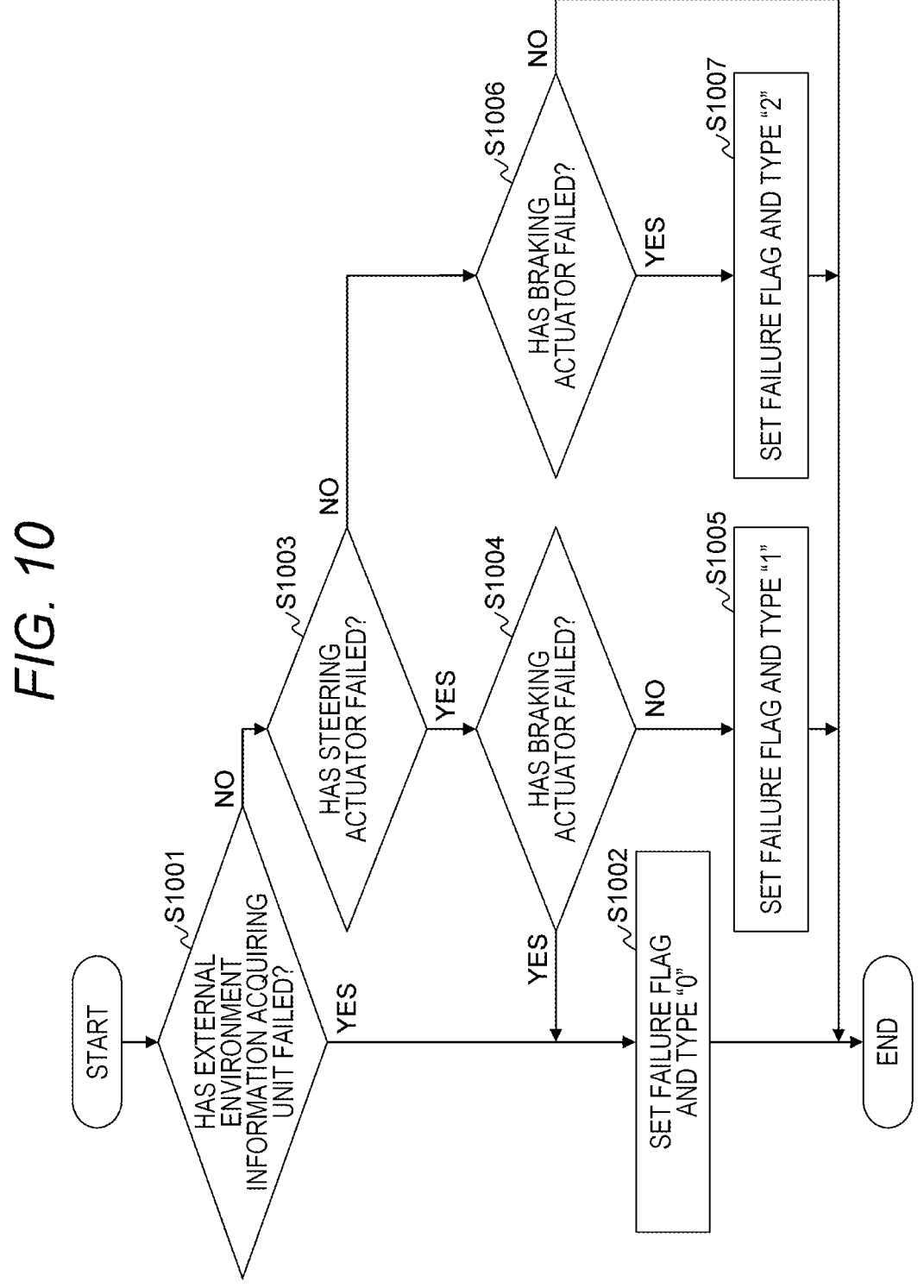
FIG. 10 is a flowchart for explaining an example of a first failure confirmation process executed by the driving assistance system of the second embodiment.

FIG. 10 is a flowchart for explaining an example of the first failure confirmation process executed by the driving assistance system of the second embodiment.

The action strategy controller 112 determines whether the external environment information acquiring unit 201 has failed (step S1001). For example, the action strategy controller 112 can determine whether a failure has occurred at the external environment information acquiring unit 201, by making an inquiry to the external environment recognition control unit 111.

When the external environment information acquiring unit 201 has failed, the action strategy controller 112 sets a failure flag and a type "0" (step S1002), and ends the first failure confirmation process.

When the external environment information acquiring unit 201 has not failed, the action strategy controller 112 determines whether a failure has occurred at the steering actuator (step S1003). For example, the action strategy controller 112 can determine whether a failure has occurred at the steering actuator, by making an inquiry to the steering actuator control unit 232.

When a failure has occurred at the steering actuator, the action strategy controller 112 determines whether a failure has occurred at the braking actuator (step S1004). For example, the action strategy controller 112 can determine whether a failure has occurred at the braking actuator, by making an inquiry to the braking actuator control unit 231.

When a failure has occurred at the braking actuator, the action strategy controller 112 outputs a control end instruction to the movement strategy controller 113 (step S1002), and ends the first failure confirmation process.

When a failure has not occurred at the braking actuator, the action strategy controller 112 sets a failure flag and a type "1" (step S1005), and ends the first failure confirmation process.

When it is determined at step S1003 that a failure has not occurred at the steering actuator, the action strategy controller 112 determines whether a failure has occurred at the braking actuator (step S1006). A process executed at step S1006 is the same as a process executed at step S1004.

When a failure has occurred at the braking actuator, the action strategy controller 112 sets a failure flag and a type "2" (step S1007), and ends the first failure confirmation process.

When a failure has not occurred at the braking actuator, the action strategy controller 112 ends the first failure confirmation process.

In the second embodiment, the content of the obstacle avoidance determination process varies depending on the failure flag and the type.

When the failure flag is not set, the obstacle avoidance determination process described in the first embodiment is executed. When the failure flag and the type "0" are set, the obstacle avoidance determination process is not executed.

Figure 11A:
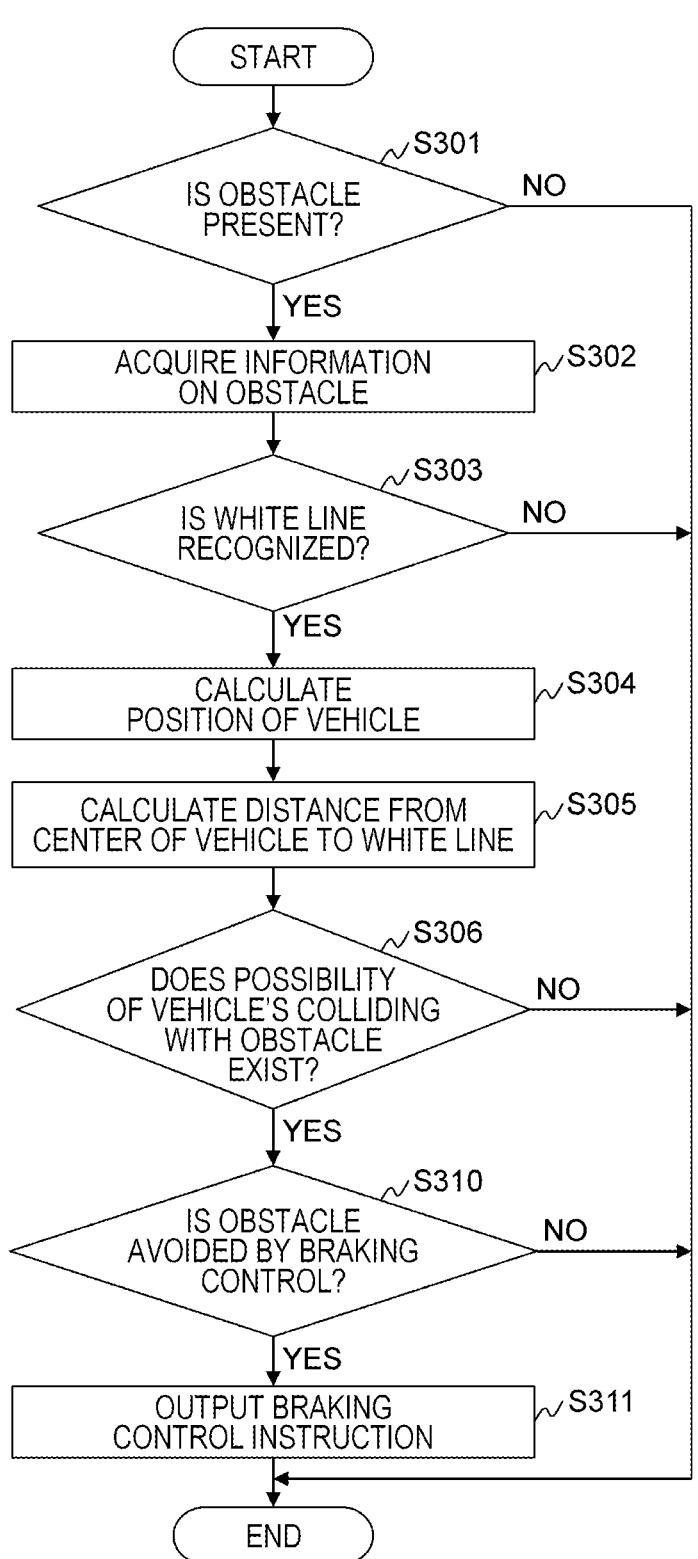
FIG. 11A is a flowchart for explaining an example of an obstacle avoidance determination process executed by the driving assistance system of the second embodiment.
Figure 11B:
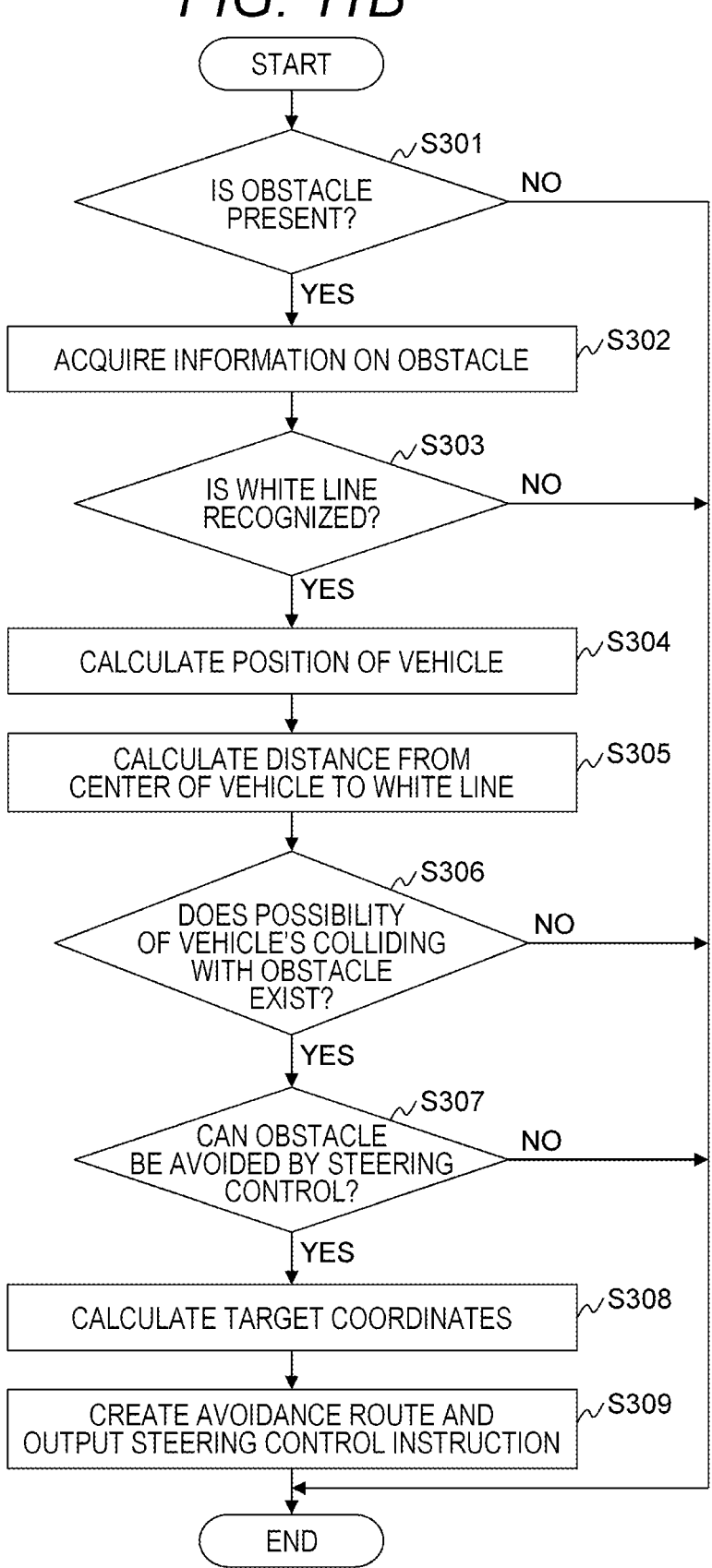
FIG. 11B is a flowchart for explaining an example of the obstacle avoidance determination process executed by the driving assistance system of the second embodiment.

FIGS. 11A and 11B are flowcharts for explaining examples of the obstacle avoidance determination process executed by the driving assistance system of the second embodiment.

FIG. 11A depicts an obstacle avoidance determination process that is executed when the failure flag and the type "1" are set. The obstacle avoidance determination process shown in FIG. 11A is almost the same as the obstacle avoidance determination process of the first embodiment, and therefore only the different point will be described.

When it is determined at step S306 that a possibility of the vehicle 100 colliding with the obstacle H exists, the braking-based avoidance determining unit 217 of the action strategy controller 112 determines whether or not to avoid the obstacle H by braking control (step S310). Other processes to follow are the same as processes in the first embodiment.

Because a failure has occurred at the steering actuator, the process related to steering-based avoidance (steps S307, S308, and S309) is omitted.

FIG. 11B depicts an obstacle avoidance determination process that is executed when the failure flag and the type "2" are set. The obstacle avoidance determination process shown in FIG. 11A is almost the same as the obstacle avoidance determination process of the first embodiment, and therefore only the different point will be described.

At step S307, when it is determined that obstacle avoidance by steering control is impossible, the action strategy controller 112 ends the obstacle avoidance determination process.

Because a failure has occurred at the braking actuator, the process related to braking-based avoidance (steps S310 and S311) is omitted.

Figures 12, 13:
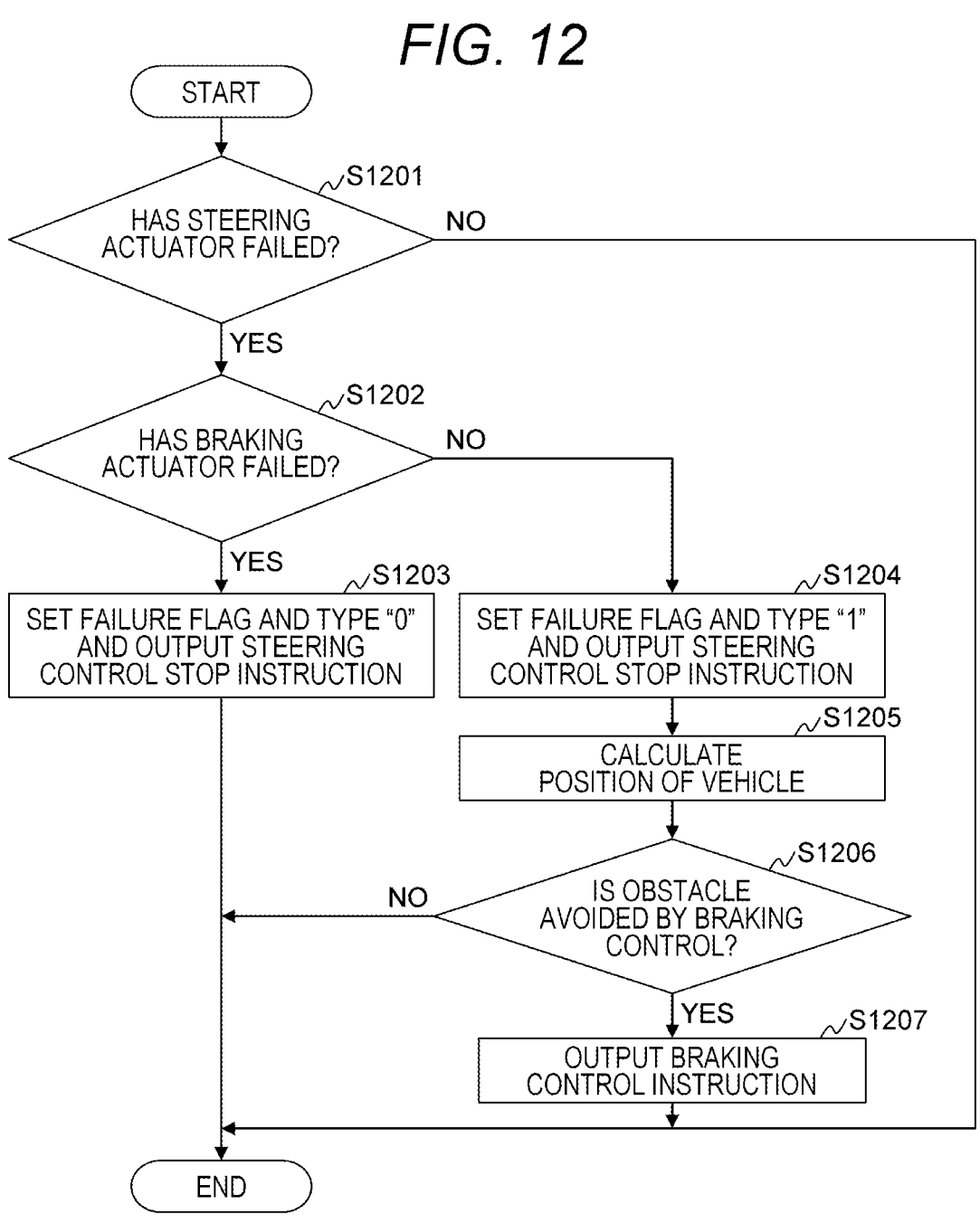
FIG. 12 is a flowchart for explaining an example of a second failure confirmation process executed by the driving assistance system of the second embodiment.
FIG. 13 is a flowchart for explaining an example of a control process executed by the driving assistance system of the second embodiment.

FIG. 12 is a flowchart for explaining an example of the second failure confirmation process executed by the driving assistance system of the second embodiment.

The action strategy controller 112 determines whether a failure has occurred at the steering actuator (step S1201). A process executed at step S1201 is the same as a process executed at step S1003.

When a failure has not occurred at the steering actuator, the action strategy controller 112 ends the second failure confirmation process. In this case, the movement strategy controller 113 executes the obstacle avoidance determination process of FIG. 6A until the obstacle H is avoided. It should be noted that when the external environment information acquiring unit 201 has failed, the position of the vehicle 100 is estimated based on a yaw rate, a vehicle speed, and the like.

When a failure has occurred at the steering actuator, the action strategy controller 112 determines whether a failure has occurred at the braking actuator (step S1202). A process executed at step S1202 is the same as a process executed at step S1004

When a failure has occurred at the braking actuator, the action strategy controller 112 sets a failure flag and the type "0", and outputs a steering control stop instruction to the movement strategy controller 113 (step S1203). Thereafter, the action strategy controller 112 ends the second failure confirmation process. The steering control stop instruction includes the type "0".

When a failure has not occurred at the braking actuator, the action strategy controller 112 sets a failure flag and the type "1", and outputs a steering control stop instruction to the movement strategy controller 113 (step S1204). The steering control stop instruction includes the type "1".

The action strategy controller 112 calculates the current position of the vehicle 100 (step S1205). A process executed at step S1205 is the same as a process executed at step S304. It should be noted that when the external environment information acquiring unit 201 has failed, the position of the vehicle 100 is estimated based on a yaw rate, a vehicle speed, and the like.

The action strategy controller 112 determines whether or not to avoid the obstacle H by braking control (step S1206). A process executed at step S1206 is the same as a process executed at step S310.

When the obstacle H is avoided by braking control, the action strategy controller 112 outputs a braking control instruction to the movement strategy controller 113 (step S1207), and ends the second failure confirmation process. A process executed at step S1207 is the same as a process executed at step S311.

Figure 14:
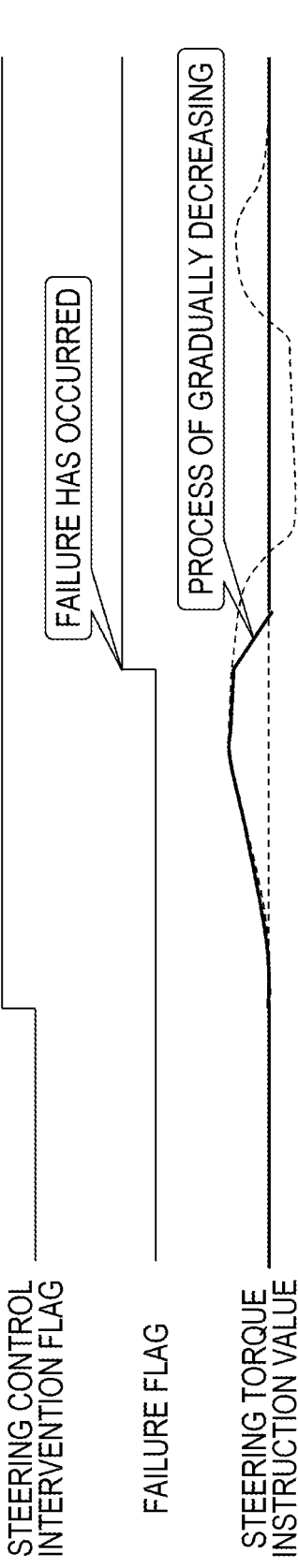
FIG. 14 depicts a state of the vehicle in the second embodiment.

FIG. 13 is a flowchart for explaining an example of a control process executed by the driving assistance system of the second embodiment. FIG. 14 depicts a state of the vehicle 100 in the second embodiment.

The process of FIG. 13 is executed when the movement strategy controller 113 receives a steering control stop instruction including the type "0".

The movement strategy controller 113 executes a process of gradually decreasing a target steering torque (step S1301).

As shown in FIG. 14, when the steering actuator fails during execution of steering-based avoidance, the movement strategy controller 113 decreases a steering torque instruction value outputted at the time of failure occurrence to 0 at a decrease rate of a constant gradient. Carrying out this process of gradually decreasing the target steering torque reduces the driver's sense of discomfort caused by a sharp torque change.

Figure 15:
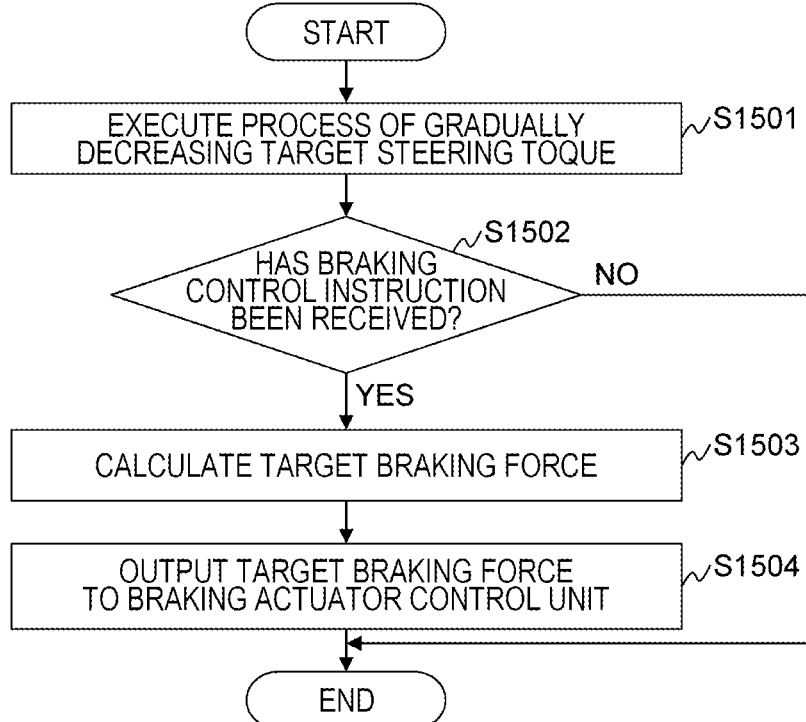
FIG. 15 is a flowchart for explaining an example of the control process executed by the driving assistance system of the second embodiment.

FIG. 15 is a flowchart for explaining an example of the control process executed by the driving assistance system of the second embodiment.

FIG. 15 depicts a control process that is executed when the movement strategy controller 113 receives a steering control stop instruction including the type "1".

The movement strategy controller 113 executes the process of gradually decreasing the target steering torque (step S1501). A process executed at step S1501 is the same as a process executed at step S1301.

The movement strategy controller 113 determines whether it has received a braking control instruction from the action strategy controller 112 (step S1502).

After completing the process of gradually decreasing the target steering torque, the movement strategy controller 113 waits input of a braking control instruction for a certain period of time. When no braking control instruction is inputted to the movement strategy controller 113 after an elapse of the certain period of time, the movement strategy controller 113 determines that it has received no braking control instruction from the action strategy controller 112.

When receiving no braking control instruction from the action strategy controller 112, the action strategy controller 112 ends the control process.

When having received a braking control instruction from the action strategy controller 112, the braking force calculating unit 221 of the movement strategy controller 113 calculates a target braking force (step S1503). A process executed at step S1503 is the same as a process executed at step S611.

The braking force calculating unit 221 of the movement strategy controller 113 outputs the target braking force to the braking actuator control unit 231 (step S1504). A process executed at step S1504 is the same as a process executed at step S612.

Figure 16:
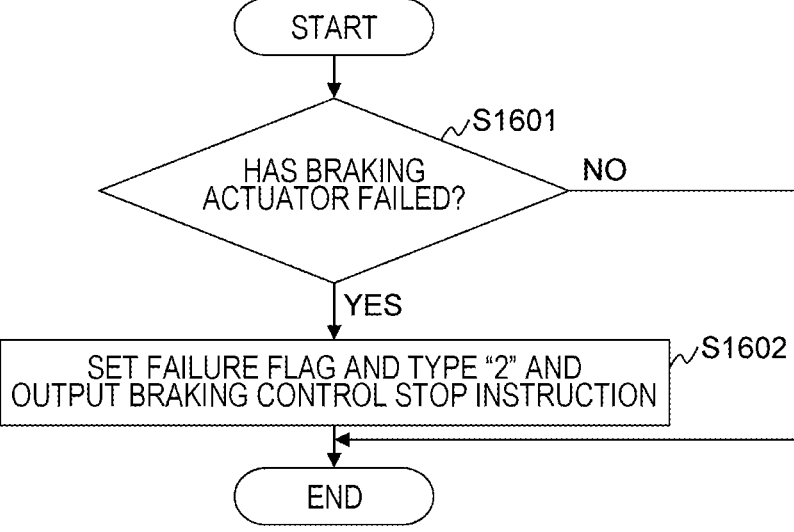
FIG. 16 is a flowchart for explaining an example of a third failure confirmation process executed by the driving assistance system of the second embodiment.
Figure 17:
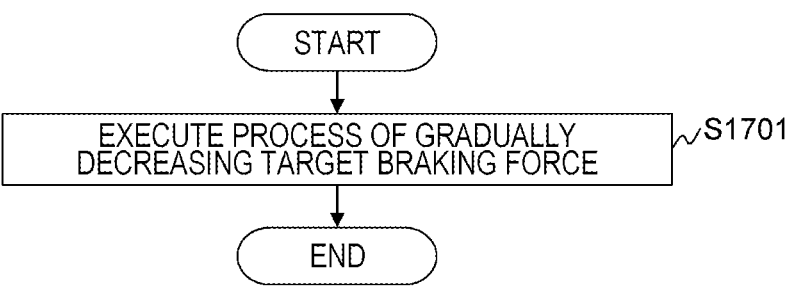
FIG. 17 is a flowchart for explaining an example of the control process executed by the driving assistance system of the second embodiment.
Figure 18:
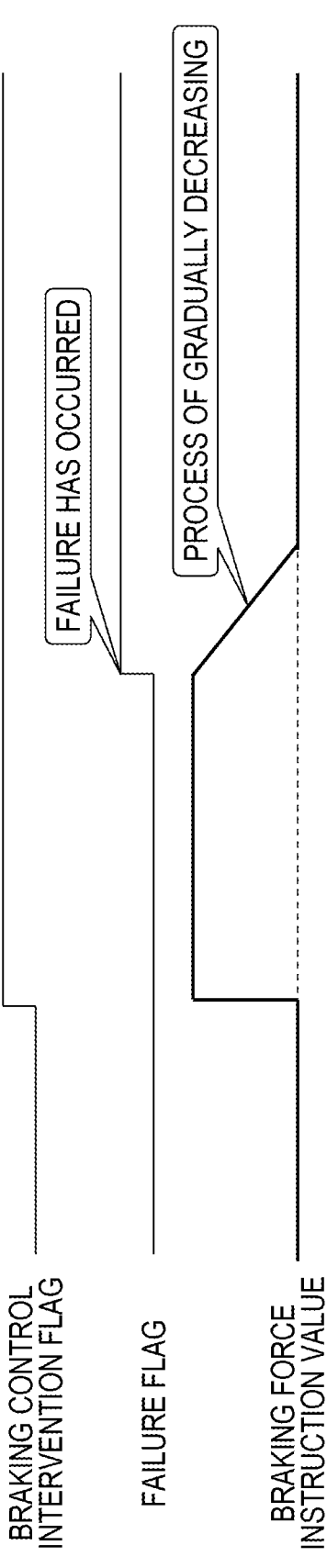
FIG. 18 depicts a state of the vehicle in the second embodiment.
Figure 19:
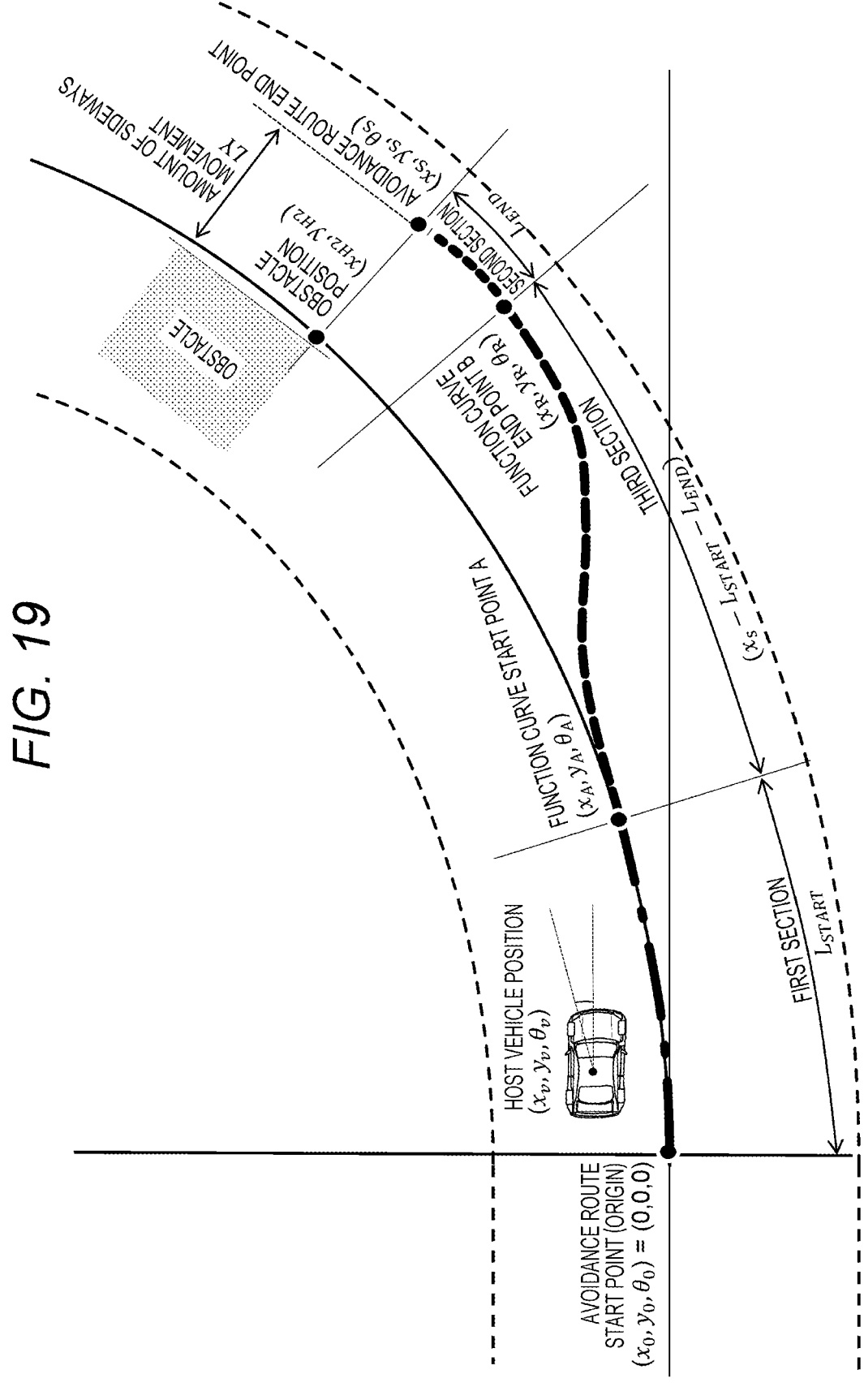
FIG. 19 depicts an example of a traveling lane and an avoidance route of the vehicle, according to a third embodiment.
Figure 20:
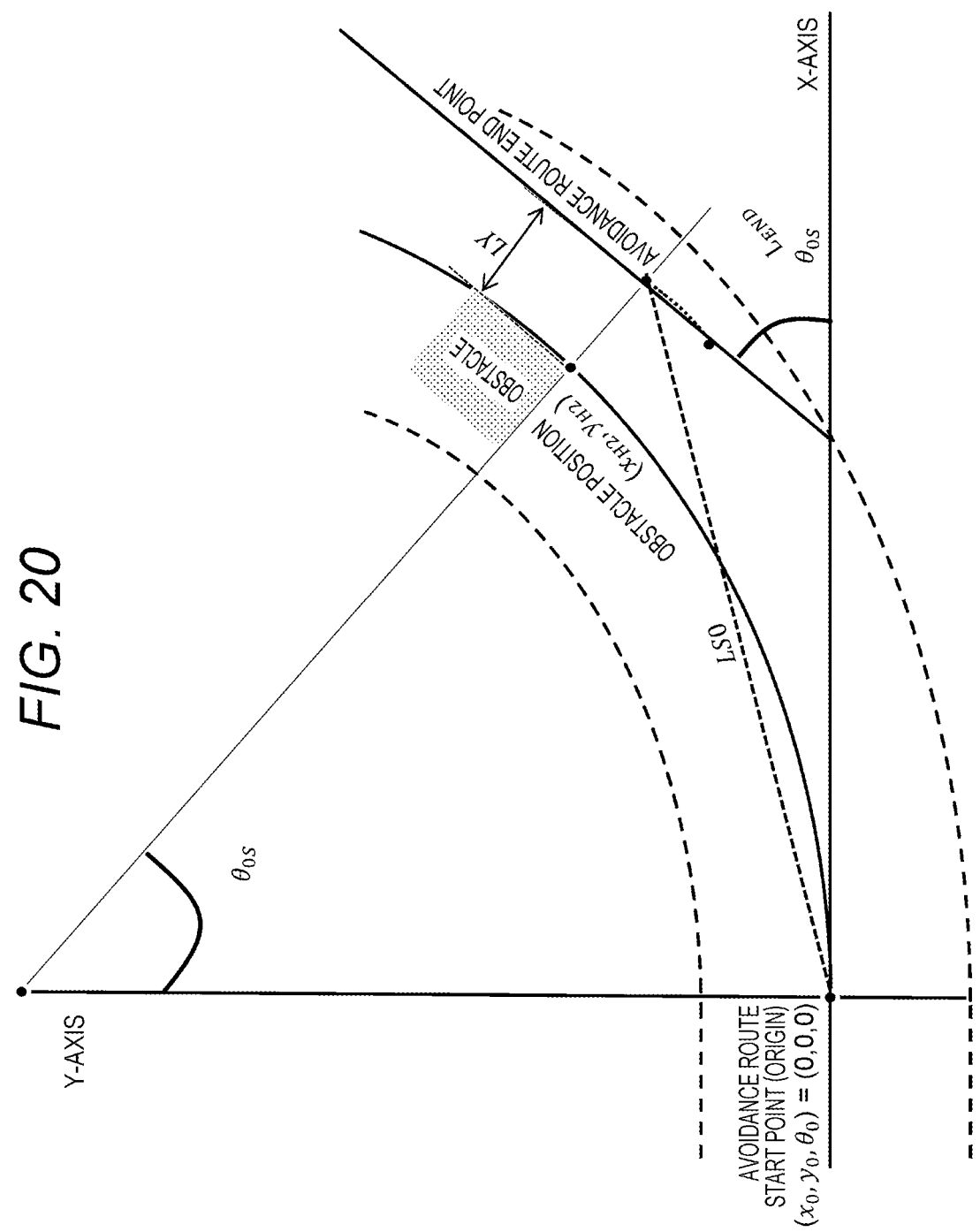
FIG. 20 is a diagram for explaining a method of calculating the coordinates of the end point of an avoidance route according to the third embodiment.
Figure 21:
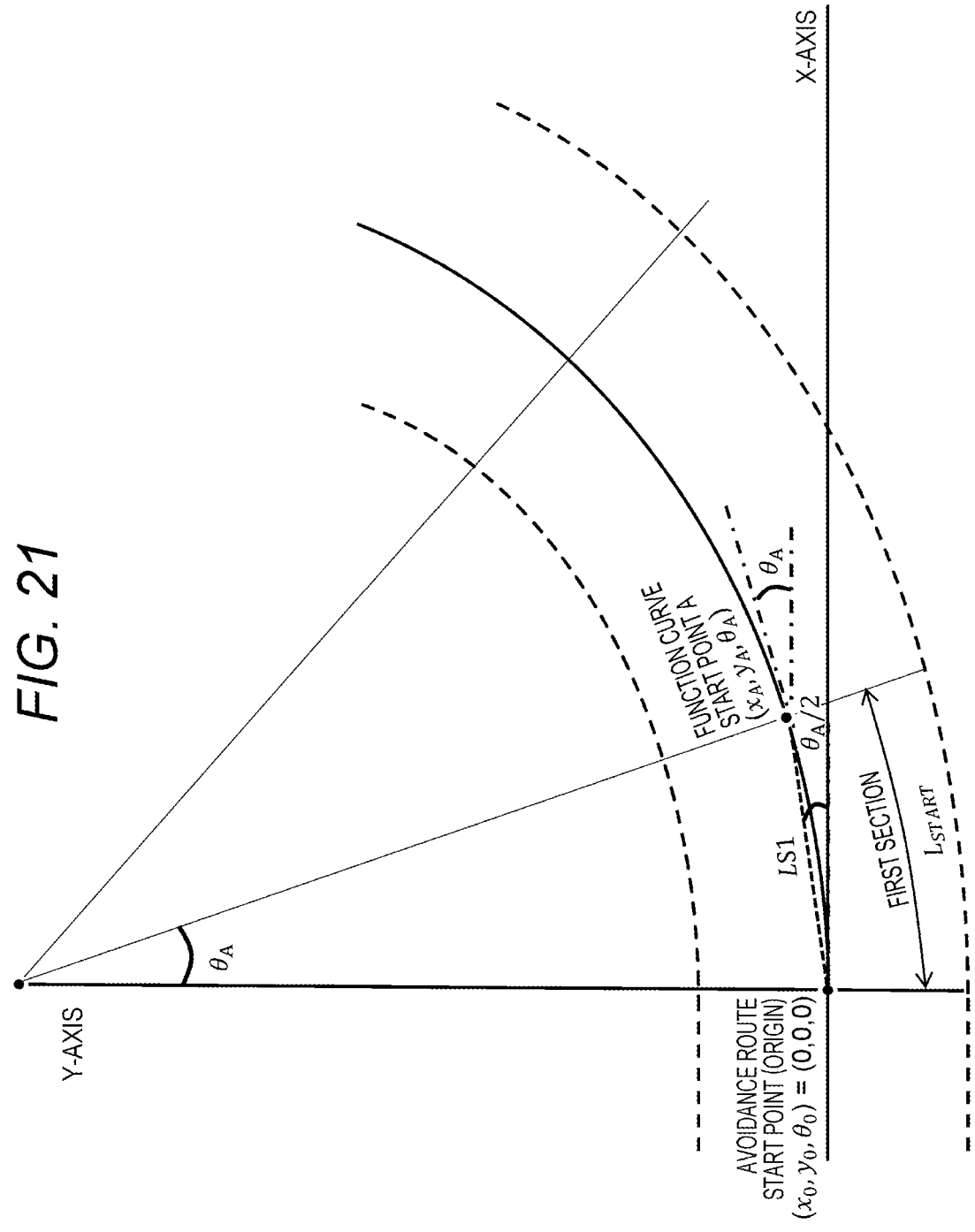
FIG. 21 is a diagram for explaining a method of calculating a function curve start point A of the avoidance route according to the third embodiment.
Figure 22:
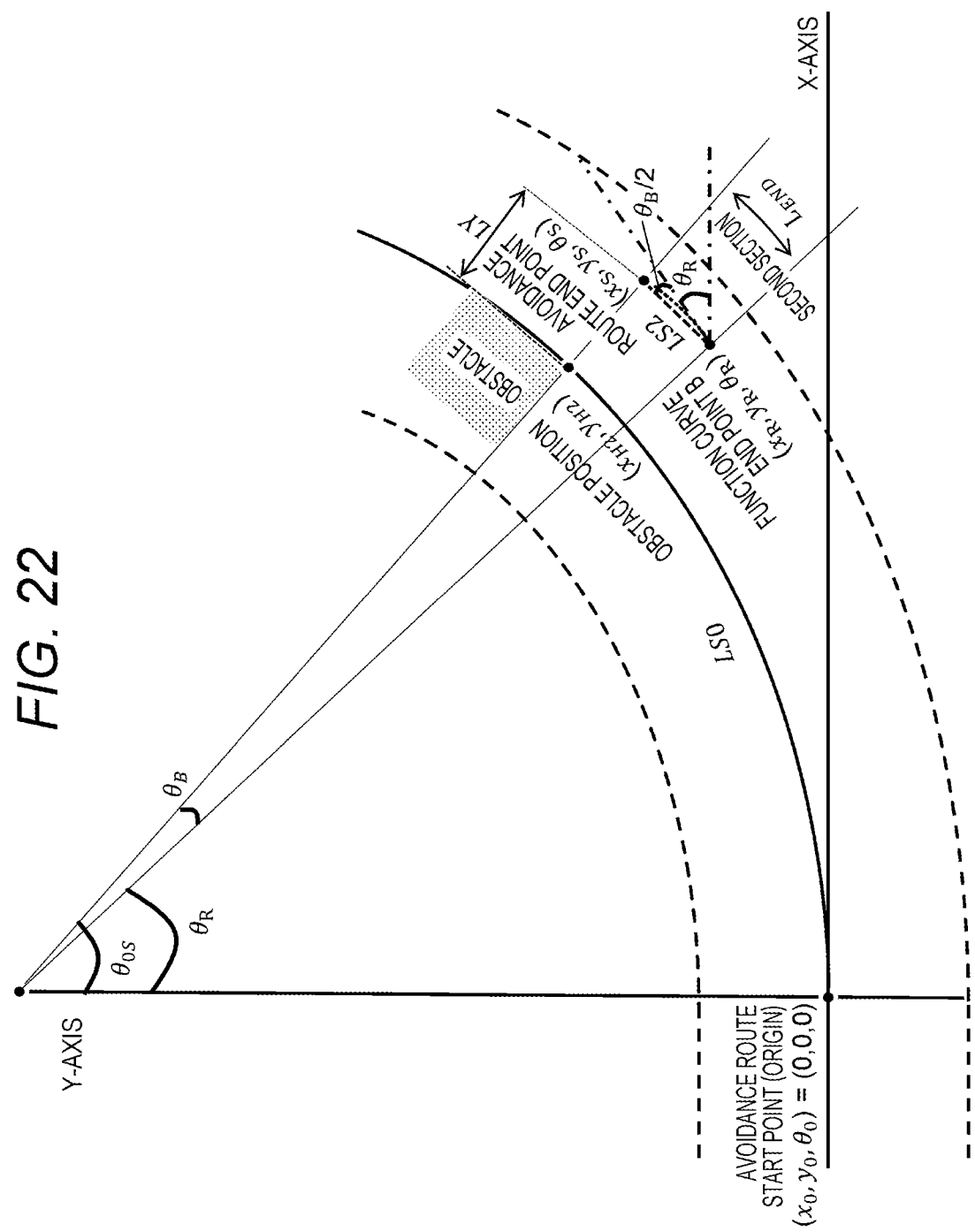
FIG. 22 is a diagram for explaining a method of calculating a function curve end point B of the avoidance route according to the third embodiment.

FIG. 16 is a flowchart for explaining an example of the third failure confirmation process executed by the driving assistance system of the second embodiment.

The action strategy controller 112 determines whether a failure has occurred at the braking actuator (step S1601). A process executed at step S1601 is the same as a process executed at step S1004.

When a failure has not occurred at the braking actuator, the action strategy controller 112 ends the third failure confirmation process. In this case, the movement strategy controller 113 executes the obstacle avoidance determination process of FIG. 6B until the obstacle H is avoided.

When a failure has occurred at the braking actuator, the action strategy controller 112 sets a failure flag and the type "2", and outputs a braking control stop instruction to the movement strategy controller 113 (step S1602). Thereafter, the action strategy controller 112 ends the third failure confirmation process.

FIG. 17 is a flowchart for explaining an example of the control process executed by the driving assistance system of the second embodiment. FIG. 18 depicts a state of the vehicle 100 in the second embodiment.

FIG. 17 depicts a control process that is executed when the movement strategy controller 113 receives a braking control stop instruction.

The movement strategy controller 113 executes a process of gradual decreasing a target braking force (step S1701).

As shown in FIG. 18, when the braking actuator fails during execution of braking-based avoidance, the movement strategy controller 113 decreases a braking force instruction value outputted at the time of failure occurrence to 0 at a decrease rate of a constant gradient. Carrying out this process of gradually decreasing the target braking force alleviates a gravitational shift caused by a sharp change in the instruction value.

According to the second embodiment, control for obstacle avoidance described in the first embodiment can be achieved as a failure of the vehicle 100 is taken into consideration.

Third Embodiment

In a third embodiment, control that is carried out when the vehicle 100 is traveling in a curved lane will be described. The third embodiment will hereinafter be described, with focus placed on a difference with the first embodiment.

The vehicle 100 of the third embodiment is the same as the vehicle 100 of the first embodiment in device configuration and functional configuration. A process executed by a driving assistance system of the third embodiment is almost the same as the process executed by the driving assistance system of the first embodiment. Nevertheless, both processes are different from each other in a method of calculating an avoidance route.

The first embodiment relates to an assumed case where the vehicle 100 traveling in a straight lane avoids its collision with the obstacle H, and therefore, according to the first embodiment, the partial avoidance routes in the first section and second section are straight routes. The third embodiment relates to a case where the vehicle 100 travels in a curved lane, and therefore a method of calculating the partial avoidance routes in the first section and second section in the third embodiment is different from the same in the first embodiment.

FIG. 19 depicts an example of a traveling lane and an avoidance route of the vehicle 100, according to the third embodiment. As shown in FIG. 19, it is assumed in the third embodiment that the vehicle 100 travels in a curved lane with a constant curvature.

FIG. 20 is a diagram for explaining a method of calculating the coordinates of the end point of an avoidance route according to the third embodiment. FIG. 21 is a diagram for explaining a method of calculating a function curve start point A of the avoidance route according to the third embodiment. FIG. 22 is a diagram for explaining a method of calculating a function curve end point B of the avoidance route according to the third embodiment.

A method of calculating the coordinates of the end point of the avoidance route and a yaw angle will first be described with reference to FIG. 20.

The action strategy controller 112 sets a curve entry position at the avoidance route start point (origin) to obtain avoidance start point coordinates and a yaw angle: $(x_0, y_0, \theta_0)=(0, 0, 0)$. The action strategy controller 112 receives the coordinates $(x_{H2}, y_{H2})$ of an end of the obstacle H, and calculates a radius R [m] defined by a curved segment formed by two points, i.e., the origin and the coordinates $(x_{H2}, y_{H2})$ of the end of the obstacle H. The action strategy controller 112 obtains the coordinates and the yaw angle of the end point of the avoidance route, the coordinates and the yaw angle being given by equation (11), from LY [m] representing an amount of sideways movement for obstacle avoidance and $\theta_{0s}$ representing a central angle the start point coordinates and the end point coordinates make.

[Equation 11]

$$(x_s, y_s, \theta_s)=(x_{H2}+LY\sin(\theta_{0s}), y_{H2}-LY\cos(\theta_{0s}), \theta_{0s}) \tag{11}$$

When the distance between the start point and the end point of the avoidance route is denoted by LS_0 [m], $\theta_{0s}$ is given by equation (12). LS_0 [m] is given by equation (13).

[Equation 12]

$$\theta_{0s}=\cos^{-1}((R^2+(R+LY)^2-LS\_0^2)/(2R(R+LY))) \tag{12}$$

[Equation 13]

$$LS\_0=\sqrt{x_s^2+y_s^2} \tag{13}$$

A method of calculating the coordinates and the yaw angle of the function curve start point A of the avoidance route will then be described with reference to FIG. 21.

Using the origin coordinates, the end point coordinates, and the yaw angle as input information, the action strategy controller 112 sets a curved segment (first partial avoidance route) of $L_{START}$ [m] in length in the first section, the curved segment corresponding to a traveling curvature. The yaw angle $\theta_A$ at the function curve start point A, which is reached by the vehicle having traveled $L_{START}$ [m] along an arc with a curvature R, is an angle the X-axis and a tangent to the function curve start point A make, and is equal to a central angle the origin and the function curve start point A make. This yields equation (14).

[Equation 14]

$$\theta_A=L_{START}/R \tag{14}$$

The distance LS_1 [m] between the origin and the function curve start point A is given by equation (15).

[Equation 15]

$$LS\_1=2R\sin(\theta_A/2 \tag{15}$$

Because an angle the gradient of a straight line LS_1 and the X-axis make is $\theta_A/2$, the coordinates $(x_A, y_A)$ of the function curve start point A are given by equation (16).

[Equation 16]

$$(x_A, y_A)=\left(LS\_1\cos\left(\frac{\theta_A}{2}\right), LS\_1\sin\left(\frac{\theta_A}{2}\right)\right) \tag{16}$$

It follows from the above that the coordinates and the yaw angle of the function curve start point A are expressed as equation (17).

[Equation 17]

$$(x_A, y_A, \theta_A)=\left(LS\_1\cos\left(\frac{\theta_A}{2}\right), LS\_1\sin\left(\frac{\theta_A}{2}\right), \theta_A\right) \tag{17}$$

A method of calculating the coordinates and the yaw angle of the function curve end point B of the avoidance route will then be described with reference to FIG. 22.

The action strategy controller 112 sets a second partial avoidance route of $L_{END}$ [m] in length in the second section. The second partial avoidance route is set as a curved segment given by adding an amount of sideways movement LY [m] for obstacle avoidance to a radius of curvature R, i.e., R+LY [m].

An angle $\theta_B$ the function curve end point B and the end point of the avoidance route make is given by equation (18).

[Equation 18]

$$\theta_B = L_{END}/(R+LY) \tag{18}$$

The yaw angle $\theta_R$ at the function curve end point B is given by equation (19).

[Equation 19]

$$\theta_R = \theta_{0,s} - \theta_B \tag{19}$$

The distance LS_2 [m] between the function curve end point B and the end point of the avoidance route is given by equation (20).

[Equation 20]

$$LS\_2 = 2(R + LY)\sin\left(\frac{\theta_B}{2}\right) \tag{20}$$

Because an angle the gradient of a straight line LS_2 and the X-axis make is $\theta_R + \theta_B/2$, the coordinates $(x_R, y_R)$ of the function curve end point B is given by equation (21).

[Equation 21]

$$(x_R, y_R) = \left(x_S - \left(LS\_2\cos\left(\theta_R + \frac{\theta_B}{2}\right)\right)\right), \tag{21}$$
$$y_S - \left(LS\_2\sin\left(\theta_R + \frac{\theta_B}{2}\right)\right)$$

It follows from the above that the coordinates and the yaw angle of the function curve end point B are expressed as equation (22).

[Equation 22]

$$(x_R, y_R, \theta_R) = \left(x_S - \left(LS\_2\cos\left(\theta_R + \frac{\theta_B}{2}\right)\right),\right.$$
$$\left. y_S - \left(LS\_2\sin\left(\theta_R + \frac{\theta_B}{2}\right)\right), \theta_R\right) \tag{22}$$

For the third section connecting two coordinates $(x_A, y_A, \theta_A)$ and $(x_R, y_R, \theta_R)$ representing the function curve start point A and the function curve end point B, respectively, a third partial avoidance route of a curves segment expressed as a cubic function given by equation (23) is calculated.

[Equation 23]

$$f(x) = ax^3 + bx^2 + cx + d \tag{23}$$

According to the third embodiment, an avoidance route that offers the same effects as the first embodiment offers can be calculated for a curved route. It should be noted that the third embodiment may be combined with the second embodiment.

It should be noted that the present invention is not limited to the above embodiments but includes various modifications. For example, the above embodiments have been described in detail for easy understanding of the present invention, and are not necessarily limited to an embodiment including all the constituent elements described above. In addition, some of constituent elements of each embodiment can be deleted therefrom or add to or replaced with constituent elements of another embodiment.

Some or all of the above constituent elements, functions, processing units, processing means, and the like may be provided as hardware, such as properly designed integrated circuits. The present invention may be embodied by a software program code that implements the functions of the embodiments. In such a case, a computer is provided with a storage medium recording the program code, and a processor incorporated in the computer reads the program code from the storage medium. In this case, the program code itself, which is read from the storage medium, implements the above functions of the embodiments, and the program code and the storage medium storing the program code constitute the present invention. Storage media for supplying such a program code include, for example, a flexible disk, a CD-ROM, a DVD-ROM, a hard disk, a solid state drive (SSD), an optical disk, a magneto-optical disk, a CD-R, a magnetic tape, a nonvolatile memory card, and a ROM.

The program code that implements the functions described in the present invention can be written in a wide variety of program or script languages, such as assembler, C/C++, perl, Shell, PHP, Python, and Java.

The software program code that implements the functions of the embodiments may be distributed via a network, in which case the program code is stored in a storage means, such as a hard disk or a memory, of a computer or in a storage medium, such as a CD-RW or a CD-R, and a processor incorporated in the computer reads the program code from the storage means or the storage medium to execute the program code.

In the above embodiments, a group of control lines/data lines considered to be necessary for description are illustrated, and all control lines/information lines making up the product are not always illustrated. All constituent elements may be interconnected.

The invention claimed is:

1. A vehicle control device that controls a vehicle, the vehicle control device comprising:

a vehicle position calculating unit that calculates a position of the vehicle;

an obstacle determining unit that determines presence or absence of an obstacle on a traveling route of the vehicle;

a collision possibility determining unit that determines whether the vehicle collides with the obstacle;

an avoidance means selecting unit that selects either braking or steering as a means for avoiding the obstacle;

a braking control value calculating unit that calculates a braking control value for achieving braking to avoid the obstacle;

a braking actuator control unit that receives the braking control value from the braking control value calculating unit and controls at least one of a plurality of wheel cylinders of the vehicle based on the braking control value;

an avoidance route calculating unit that calculates an avoidance route for avoiding the obstacle;

a steering control value calculating unit that calculates a steering control value for achieving steering to avoid the obstacle, based on a position of the vehicle and on the avoidance route; and a steering actuator control unit that receives the steering control value from the steering control value calculating unit and controls a steering device of the vehicle based on the steering control value, wherein the avoidance route calculating unit calculates a target point for avoiding the obstacle, divides an avoidance section into a first section including a position of the vehicle, a second section including the target point, and a third section connecting the first section to the second section, calculates, for the first section, a first partial avoidance route for compensating at least a delay in steering response by the steering actuator control unit or a delay caused by dynamic characteristics of the vehicle, calculates, for the second section, a second partial avoidance route for ensuring stability of behavior of the vehicle in avoidance of the obstacle, calculates, for the third section, a third partial avoidance route for avoiding the obstacle, and calculates the avoidance route made up of the first partial avoidance route, the second partial avoidance route, and the third partial avoidance route.

2. The vehicle control device according to claim 1, wherein the first partial avoidance route and the second partial avoidance route are routes in which steering for avoiding the obstacle is not performed, and the third partial avoidance route is a route in which steering for avoiding the obstacle is started from an end point of the first section and is ended at a start point of the second section.

3. The vehicle control device according to claim 1, wherein a length of the first section is set based on at least a worst value of a parameter related to a delay in steering response by the steering actuator control unit or a worst value of a parameter related to a delay caused by dynamic characteristics of the vehicle.

4. The vehicle control device according to claim 1, wherein a length of the second section is set based on a parameter related to a degree of a sense of security given to the driver.

5. The vehicle control device according to claim 1, wherein the avoidance means selecting unit selects a means for avoiding the obstacle, based on a state of failure of the braking actuator control unit and of the steering actuator control unit.

6. An obstacle avoidance control method executed by a vehicle control device that controls a vehicle, the vehicle control device including a controller, a braking actuator control unit that controls braking of the vehicle, and a steering actuator control unit that controls steering of the vehicle, wherein the controller controls the braking actuator control unit and the steering actuator control unit, the obstacle avoidance control method comprising:

a first step at which the controller determines presence or absence of an obstacle on a traveling route of the vehicle;

a second step at which the controller calculates a position of the vehicle;

a third step at which the controller determines whether a possibility of the vehicle's colliding with the obstacle exists;

a fourth step at which when determining that a possibility of the vehicle's colliding with the obstacle exists, the controller selects either braking or steering as a means for avoiding the obstacle;

a fifth step at which when selecting braking as a means for avoiding the obstacle, the controller calculates a braking control value for achieving braking to avoid the obstacle and outputs the braking control value to the braking actuator control unit, a sixth step at which when selecting braking as a means for avoiding the obstacle, the braking actuator control unit controls at least one of a plurality of wheel cylinders of the vehicle based on the braking control value received from the controller;

a seventh step at which when selecting steering as a means for avoiding the obstacle, the controller calculates an avoidance route, calculates a steering control value for achieving steering to avoid the obstacle, based on the position of the vehicle and the avoidance route, and outputs the steering control value to the steering actuator control unit, wherein the seventh step includes performing, by the controller:

calculating a target point for avoiding the obstacle;

dividing an avoidance section into a first section including the position of the vehicle, a second section including the target point, and a third section connecting the first section to the second section;

for the first section, calculating a first partial avoidance route for compensating at least a delay in steering response by the steering actuator control unit or a delay caused by dynamic characteristics of the vehicle, for the second section, calculating a second partial avoidance route for ensuring stability of behavior of the vehicle in avoidance of the obstacle, for the third section, calculating a third partial avoidance route for avoiding the obstacle by starting obstacle avoidance from an end point of the first section, and a calculating the avoidance route made up of the first partial avoidance route, the second partial avoidance route, and the third partial avoidance route; and when selecting steering to avoid the obstacle, providing the steering control value to the steering actuator control unit, wherein the steering actuator control unit controls a steering device of the vehicle based on the steering control value received from the controller.

7. The obstacle avoidance control method according to claim 6, wherein the first partial avoidance route and the second partial avoidance route are routes in which steering for avoiding the obstacle is not performed, and the third partial avoidance route is a route in which steering for avoiding the obstacle is performed and is ended at a start point of the second section.

8. The obstacle avoidance control method according to claim 6, wherein a length of the first section is set based on at least a worst value of a parameter related to a delay in steering response by the steering actuator control unit or a worst value of a parameter related to a delay caused by dynamic characteristics of the vehicle.

9. The obstacle avoidance control method according to claim 6, wherein a length of the second section is set based on a parameter related to a degree of a sense of security given to the driver.

10. The obstacle avoidance control method according to claim 6, wherein the fourth step includes a step at which the controller selects a means for avoiding the obstacle, based on a state of failure of the braking actuator control unit and of the steering actuator control unit.

11. A vehicle control device that controls a vehicle, the vehicle control device comprising:

a vehicle position calculating unit that calculates a position of the vehicle;

an obstacle determining unit that determines presence or absence of an obstacle on a traveling route of the vehicle;

a collision possibility determining unit that determines whether the vehicle collides with the obstacle;

an avoidance route calculating unit that calculates an avoidance route for avoiding the obstacle;

a steering control value calculating unit that calculates a steering control value for achieving steering to avoid the obstacle, based on a position of the vehicle and on the avoidance route; and a steering actuator control unit that receives the steering control value from the steering control value calculating unit and controls a steering device of the vehicle based on the steering control value, wherein the avoidance route calculating unit calculates a target point for avoiding the obstacle, divides an avoidance section connecting the position of the vehicle to the target point into a first section including the position of the vehicle, a second section including the target point, and a third section connecting the first section to the second section, calculates, for the first section, a first partial avoidance route for compensating at least a delay in steering response by the steering actuator control unit or a delay caused by dynamic characteristics of the vehicle, calculates, for the second section, a second partial avoidance route for ensuring stability of behavior of the vehicle in avoidance of the obstacle, and calculates, for the third section, a third partial avoidance route for avoiding the obstacle.

\* \* \* \* \*